United States Patent
Gutierrez et al.

(10) Patent No.: US 9,196,139 B2
(45) Date of Patent: Nov. 24, 2015

(54) PROXIMITY TAG FOR OBJECT TRACKING

(75) Inventors: Gerald Gutierrez, Richmond (CA); Sunny Chan, Richmond (CA); Gary Wong, Vancouver (CA); Samson Lee, Vancouver (CA); Sorin Antonescu, Burnaby (CA); Michael Li, Coquitlam (CA)

(73) Assignee: ACCO Brands Corporation, Lake Zurich, IL (US)

( * ) Notice: Subject to any disclaimer, the term of this patent is extended or adjusted under 35 U.S.C. 154(b) by 241 days.

(21) Appl. No.: 13/612,576

(22) Filed: Sep. 12, 2012

(65) Prior Publication Data
US 2014/0073262 A1    Mar. 13, 2014

(51) Int. Cl.
| | |
|---|---|
| H04B 17/00 | (2015.01) |
| G08B 13/22 | (2006.01) |
| G08B 21/02 | (2006.01) |
| H04M 1/725 | (2006.01) |

(52) U.S. Cl.
CPC ............ *G08B 13/22* (2013.01); *G08B 21/0247* (2013.01); *H04M 1/7253* (2013.01); *Y02B 60/50* (2013.01)

(58) Field of Classification Search
CPC ............ H04M 1/72516; G08B 3/1033; G08B 3/1041
USPC .............. 455/420, 421, 41.1, 41.2, 41.3, 566, 455/67.7, 134, 156.1, 157.2, 158.2, 159.1; 340/539.15, 539.21, 539.23, 539.32
See application file for complete search history.

(56) References Cited

U.S. PATENT DOCUMENTS

| | | | |
|---|---|---|---|
| 5,796,338 A * | 8/1998 | Mardirossian | 340/571 |
| 5,963,131 A | 10/1999 | D'Angelo et al. | |
| 6,133,830 A | 10/2000 | D'Angelo et al. | |
| 6,265,974 B1 | 7/2001 | D'Angelo et al. | |
| 7,042,360 B2 | 5/2006 | Light et al. | |

(Continued)

FOREIGN PATENT DOCUMENTS

| | | |
|---|---|---|
| DE | 202010012122 | 4/2011 |
| ES | 2257942 | 2/2007 |

OTHER PUBLICATIONS

BiKN. Datasheet [online]. Treehouse Labs LLC, 2012 [retrieved on Sep. 26, 2012]. Retrieved from the Internet: <URL: http://www.bikn.com/>, 1 page.

(Continued)

*Primary Examiner* — Tuan Pham
(74) *Attorney, Agent, or Firm* — Michael Best & Friedrich LLP

(57) ABSTRACT

Embodiments of the present invention relate to a systems and methods of loss prevention, discovery, and tracking of personal belongings through the use of wireless hardware and mobile electronic devices such as smartphones, tablet computers, and portable computers. One embodiment of the present invention may be directed to a mobile communication device comprising a processor, an antenna, a transceiver device electrically coupled to the antenna and the processor, and a computer readable medium coupled to the processor and comprising code executable by the processor to implement a method. The method may include receiving a wireless communication from a wireless apparatus attached to an object, determining a signal strength reading from the communication, determining if the signal strength reading is below an adaptable alert threshold, and if the signal strength reading is below the alert threshold, alerting a user.

18 Claims, 15 Drawing Sheets

(56) References Cited

U.S. PATENT DOCUMENTS

| | | |
|---|---|---|
| 7,076,255 B2 | 7/2006 | Parupudi et al. |
| 7,190,264 B2 | 3/2007 | Brown et al. |
| 7,375,638 B2 | 5/2008 | Light et al. |
| 7,696,887 B1 | 4/2010 | Echavarria |
| 7,741,974 B1 | 6/2010 | Kuo |
| 8,254,902 B2 | 8/2012 | Bell et al. |
| 2003/0063003 A1* | 4/2003 | Bero et al. ............... 340/573.1 |
| 2003/0122671 A1* | 7/2003 | Jespersen ................. 340/568.1 |
| 2004/0203700 A1* | 10/2004 | Chan et al. ................. 455/421 |
| 2006/0079196 A1* | 4/2006 | Atsumi ....................... 455/313 |
| 2006/0090200 A1 | 4/2006 | Oie |
| 2006/0205394 A1 | 9/2006 | Vesterinen |
| 2006/0238302 A1 | 10/2006 | Loving et al. |
| 2007/0032225 A1 | 2/2007 | Konicek et al. |
| 2007/0129113 A1 | 6/2007 | Klicpera et al. |
| 2009/0045958 A1 | 2/2009 | Spano |
| 2009/0207013 A1 | 8/2009 | Ayed |
| 2010/0019920 A1 | 1/2010 | Ketari |
| 2010/0022217 A1 | 1/2010 | Ketari |
| 2010/0054210 A1* | 3/2010 | Ostergren ................... 370/332 |
| 2010/0178913 A1 | 7/2010 | Herbert et al. |
| 2010/0283600 A1 | 11/2010 | Herbert et al. |
| 2011/0212702 A1 | 9/2011 | Howard et al. |

OTHER PUBLICATIONS

Cobra Tag. Datasheet [online]. Cobra Electronics Corporation [retrieved on Sep. 26, 2012]. Retrieved from the Internet: <URL: https://www.cobra.com/detail/cobra-tag.cfm>, 1 page.

Wireless Leash. Datasheet [online]. Zomm, LLC, 2010, 2011 [retrieved on Sep. 26, 2012]. Retrieved from the Internet: <URL: http://www.zomm.com/products/wireless-leash>, 3 pages.

Wireless Leash Plus. Datasheet [online]. Zomm, LLC, 2010, 2011 [retrieved on Sep. 26, 2012]. Retrieved from the Internet: <URL: http://www.zomm.com/products/wireless-leash-plus>, 3 pages.

Nio. Datasheet [online]. Bluenio Ltd., 2012 [retrieved on Sep. 26, 2012]. Retrieved from the Internet: <URL: http://www.bluenio.com/>, 1 page.

Digifit Connect Bike Case with Built-in Transceiver. Datasheet [online]. Digifit, Inc., 2012 [retrieved on Sep. 26, 2012]. Retrieved from the Internet: <URL: http://new.digifit.com/iphone-bike-case/>, 3 pages.

U.S. Appl. No. 13/571,186, filed Aug. 9, 2012, Proximity Tag for Object Tracking, 88 pages.

* cited by examiner

Wireless Apparatus State Transitions

PROXIMITY TAG FOR OBJECT TRACKING

BACKGROUND

A person typical carries several important items such as identity papers, mobile electronics including those that contain personal information, and objects of convenience on which modern life depends. However, daily life also presents many distractions that lead to accidental loss. The day-to-day time challenges further compound the problems as one usually has little time to discover or locate such lost items. Loss of such items is inconvenient at the least and leads to identity theft at the worst. Additionally, the proliferation of mobile electronics has increased the rates of theft and accidental loss. The increasing performance and versatility of such products have also increased the immediate and consequential costs of such losses in the form of replacement and potential breach of privacy.

Accordingly, there is a need to provide a fast, easy, and effective system for tracking objects prior to their loss as well as helping a user find such objects once they are lost. Furthermore, there is a need to limit false alarms due to environmental disturbances in tracking systems and increase the performance, power supply life, and power efficiency of such systems.

Embodiments of the invention address these and other problems.

BRIEF SUMMARY

The devices and systems described in this document relate to a system of loss prevention, discovery, and tracking of personal belongings through the use of wireless hardware and mobile electronic devices such as smartphones, tablet computers, and portable computers. Specifically, embodiments of the present invention are directed at systems and methods to monitor the proximity of personal possessions using small radio transceivers (e.g. "tags" or "fobs") attached to objects of interest (i.e. "monitored objects") and wirelessly connecting to a mobile communication device such as a smartphone, a tablet computer, or a wearable device with computing capabilities running an object proximity and tracking application.

The application generates an alert when a monitored object moves beyond a predetermined monitoring range (e.g. a safe zone) and/or radio communication range (the "Separation Alert"), when a previously out-of-range object re-enters monitoring range (the "Approach Alert"), or when a monitored object moves if the object is supposed to be stationary (the "Movement Alert"). Additionally, the application may allow a special tag (a "fob") to page the mobile communication device using a wireless apparatus (a "fob") attached to a monitored object. Furthermore, the application may allow a user to locate the monitored objects through proximity detection and paging when they are in radio communication range, record the last known location of the monitored objects when they are beyond radio communication range, and visually identify the monitored objects using selected or user generated visual identifiers. Finally, the application may adaptively alter the behavior of the system to manage battery life as well as adaptively qualify and generate alerts to minimize false alarms.

One embodiment of the present invention may be directed to a mobile communication device comprising a processor, an antenna, a transceiver device electrically coupled to the antenna and the processor, and a computer readable medium coupled to the processor and comprising code executable by the processor to implement a method. The method may include receiving a wireless communication from a wireless apparatus attached to an object, determining a signal strength reading from the communication, determining if the signal strength reading is below an adaptable alert threshold, and if the signal strength reading is below the alert threshold, alerting a user.

Another embodiment may be directed to a method including receiving a wireless communication from a wireless apparatus attached to an object, determining a signal strength reading from the communication, determining if the signal strength reading is below an adaptable alert threshold, and if the signal strength reading is below the alert threshold, alerting a user.

Another embodiment may be directed to a wireless apparatus for use with a mobile communication device comprising a processor, an antenna, a transceiver device electrically coupled to the antenna and the processor, and a computer readable medium coupled to the processor and comprising code executable by the processor to implement a method. The method may include receiving a wireless communication from the mobile communication device, determining a signal strength value, generating a wireless response including the signal strength value, and sending the wireless response to the mobile communication device. The signal strength value is then used by the mobile communication device to determine a signal strength reading, determine if the signal strength reading is below an alert threshold, and if the signal strength reading is below the alert threshold, the mobile communication device alerts a user.

Another embodiment of the present invention may be directed to a method including receiving a wireless communication from the mobile communication device, determining a signal strength value, generating a wireless response including the signal strength value, and sending the wireless response to the mobile communication device. The signal strength value is then used by the mobile communication device to determine a signal strength reading, determine if the signal strength reading is below an alert threshold, and if the signal strength reading is below the alert threshold, the mobile communication device alerts a user.

These and other embodiments are described in further detail below.

DETAILED DESCRIPTION

Figure 1:
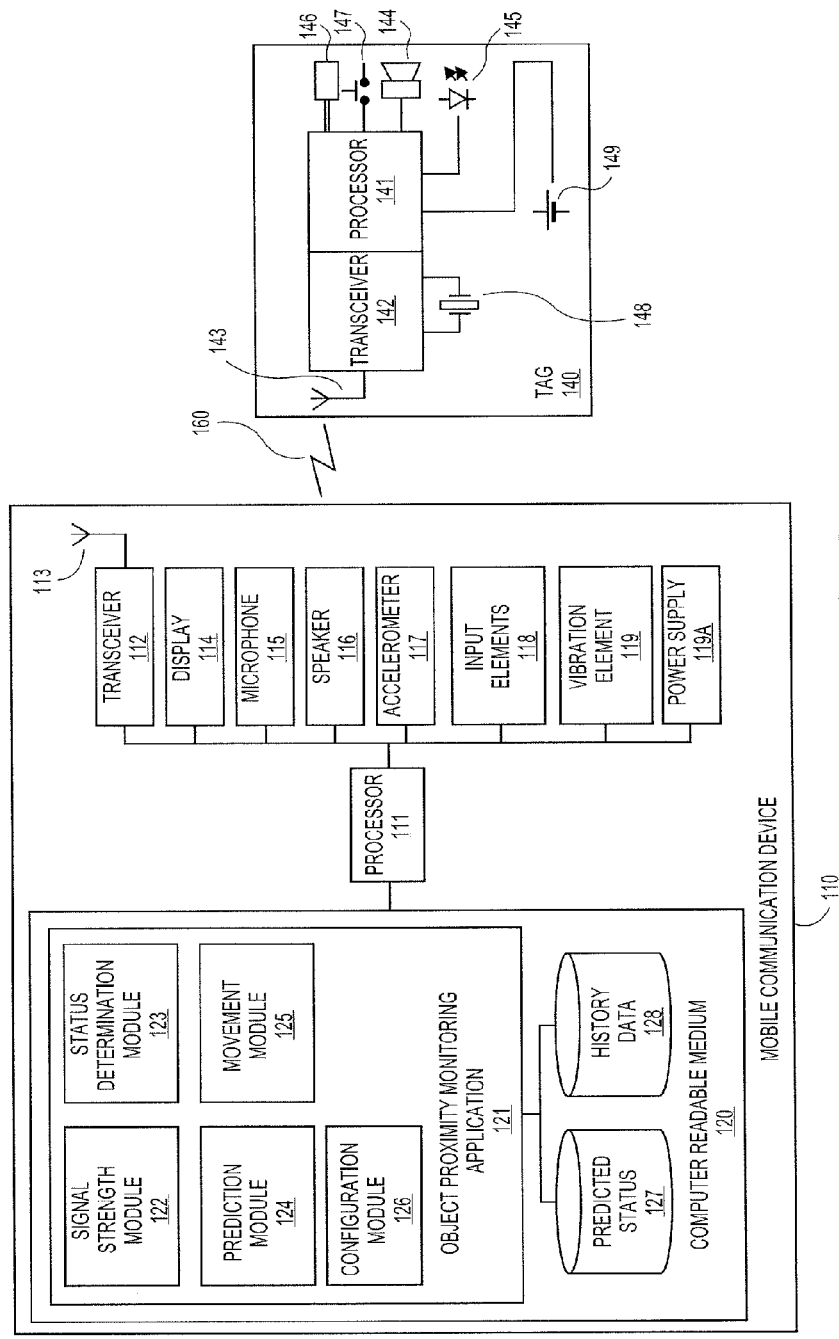
FIG. 1 shows a block diagram illustrating an object proximity and tracking system according to embodiments of the invention.

Embodiments of the present invention relate to a security and monitoring solution for objects of interest to a user. In embodiments of the present invention, a mobile communication device such as a smartphone monitors the proximity of objects of interest for tracking, paging, and location. The system tracks the location of tags that are attached to objects of interest to a user. The system also allows the mobile communication device itself to be monitored, tracked and paged by one or more of the aforementioned objects of interest.

Embodiments of the invention relate to an object tag proximity alert system including a mobile communication device (e.g. a mobile phone) running an application and one or more wireless apparatuses (e.g. tags or fobs) comprising transceivers. The tag or fob may be attached to an object and may communicate with the mobile phone. The mobile phone may alert a user if a tag moves out of a predetermined proximity range from the mobile device, or if a monitored tag that is supposed to be stationary is detected to be moving. The mobile phone continually transmits wireless communications to connected and authenticated tags. A tag periodically monitors the signal strength of messages received from the mobile phone by determining a received signal strength indicator ("RSSI") reading and sends the RSSI readings to the mobile phone. An object proximity tracking application running on the mobile phone determines the behavior of the tag and the system as a whole using the RSSI reading. If a tag's signal strength readings go below a certain alert threshold, a user may be alerted. Additionally, functionality relating to setting an adaptive threshold (signal strength threshold can change based on environment), adaptive transmission rate (rate of transmission changes when battery is low or if the connection status changes), and adaptive transmission power (transmission power is lowered when battery low) can be used to improve system performance and battery life.

Embodiments of the present invention provide a number of technical advantages. The security system provides a simple, efficient, interactive, customizable, and effective solution to monitoring, tracking, and receiving notifications regarding objects of interest. The system allows a consumer to rest assured that their objects of interest are within a safe distance of them at all times and that the user will be notified if their objects of interest move out of a predetermined distance.

Prior to discussing particular embodiments of the technology, a further description of some terms can provide a better understanding of embodiments of the technology.

A "wireless apparatus" can include any electronic device that includes a means for communicating with a mobile communication device or another electronic device. For example, a wireless apparatus may include a fob, a tag, or a zone tag that communicates with a mobile communication device. The wireless apparatus may be an independent device or may be a sub-component or portion of another device. Additionally, the wireless apparatus may comprise any means for communicating with the mobile communication device including a transmitter, receiver, transceiver, separate antenna, or any other components that are suitable for sending and receiving wireless communication signals. The wireless apparatus may be portable or small enough that a user can attach the wireless apparatus to a personal object without interfering with the operation or utility of the personal object. The wireless apparatus may also comprise components that allow it to alert a user to its location if it is paged or in some embodiments, if the wireless apparatus enters an alarm condition.

There may be multiple types of wireless apparatuses. For example, wireless apparatuses may include a tag, a fob, and a zone tag. A "tag" may be attached to an object of interest and may be tracked using the mobile communication device so that a user may be alerted when the monitored object leaves a pre-selected sensitivity setting, cannot be found by the user, or any other suitable time that a user may wish to know where the monitored object is located.

A "fob" may comprise the functionality of the tag but may also include functionality such that the user may page the mobile communication device using the tag (e.g. using a "find my phone" button). Additionally, the fob may provide a security solution for the mobile communication device such that the fob may alert the user if the mobile communication device is separated from the user by more than a predetermined distance. As such, the fob may be attached to objects that are in the user's possession most of the time (e.g. car keys) so that the user may be alerted by the fob if the user is separated from their mobile communication device.

A "zone tag" may be a type of wireless apparatus that may be used in a particular zone or area that the user would like to change the behavior of the system. For example, a zone tag may be used in a user's home so that when the user is in their home, the configuration settings of the security application (the "profile settings") are altered to create a more relaxed or "safe zone" setting. The safe zone setting may relax the monitoring settings of the system (e.g. the alert threshold, the hold-off time, etc.) so that the user is not annoyed by false alarms. The safe zone assumes that objects of interest may be left and separated from the user on purpose without the same security concerns of public places. For example, a user may be separated from their important items by a further distance in their home than they would in a public space because their home is a secure environment. Accordingly, the settings for the monitored objects and the monitoring system may be relaxed automatically while receiving an indication of such a zone from a zone tag. Zone tags may be used in any other suitable manner as well. For example, a heightened security state could be implemented through a "danger zone" setting using a zone tag. For example, if an office is known for being open and having multiple people with access, a "danger zone" zone tag may be implemented to remind the user to be especially careful and not to leave objects of interest unattended. The range of the zone tags may be configured using the application as well as the configuration settings that are implemented with each zone tag.

A "mobile communication device" can include any electronic device with a means for communicating with other electronic devices or wireless apparatus. The mobile communication device may include a mobile phone, tablet, digital music player, netbook, laptop, or any other electrical device that comprises a means for wireless communication. The mobile communication device may be wirelessly coupled to one or more wireless apparatuses through any suitable wireless communication components and communication protocols (e.g. Bluetooth™ Low Energy communications). The mobile communication device and a wireless apparatus may share information through wireless communications that include commands, data to be stored on a memory of either device, or any other information that may control the behavior of the mobile communication device or the wireless apparatus. While the description below focuses on mobile communication devices, aspects of the invention may be implemented with any portable device and should not be limited to mobile communication devices alone. Additionally, the mobile communication device may communicate with multiple wireless apparatuses at the same or substantially similar time and the following description should not be limited to a single pairing of a mobile communication device and wireless apparatus. Additionally, settings on the object proximity tracking application may be implemented such that different settings affect different wireless apparatuses. For example, the mobile communication device may have a close range alert threshold for one wireless apparatus attached to a monitored object and a long range alert threshold for a second wireless apparatus attached to a second monitored object.

A "wireless signal request" can include any wireless communication signal, data message, data package, or data stream sent by an electronic device requesting a response from another electronic device. For example, the mobile communication device may send a wireless signal request to the wireless apparatus requesting a response message. The wireless signal request may comprise commands, state or operational information, responses to a previous communication received from the wireless apparatus, or any other data that would be useful to share between electronic devices. The information may be shared through any suitable communication scheme including cellular network communication, short-range communications (e.g. Bluetooth™ or other short-range communication), internet or WI-FI communications, or any other suitable communication scheme as would be recognized by one of ordinary skill in the art.

A "wireless signal response" can include any wireless communication signal, data message, data package, or data stream sent by an electronic device in response to a wireless signal request received from another electronic device. For example, the wireless apparatus may send a wireless signal response back to the mobile communication device in response to a wireless signal request. Similar to the wireless signal request, the wireless signal response may comprise commands, state or operational information, responses to a previous communication received from the second wireless apparatus, or any other data that would be useful to share between electronic devices. The information may be shared through any suitable communication scheme including cellular network communication, short-range communications (e.g. Bluetooth™ or other near-field communication), internet or WI-FI communications, or any other suitable communication scheme as would be recognized by one of ordinary skill in the art.

A "signal strength reading" may include any measurement of a wireless communication message received from a mobile communication device. For example, a signal strength reading may comprise a received signal strength indicator (RSSI) reading. RSSI measures the power present in a received radio signal. Any other suitable measurement of the received signal may also be implemented (e.g. signal strength readings based on transmission time, etc.).

An "expected signal strength reading" may include a signal strength reading value that is predicted based on previously received signal strength readings. For example, an application running on a mobile communication device may predict the next signal strength reading or a predetermined number of upcoming signal strength readings based on one or more previously received signal strength readings. For instance, because signal strength readings may be transmitted at regular intervals, changes in signal strength readings may be gradual and relatively predictable when based on legitimate activities and not temporary or non-recurring environmental effects. Accordingly, the mobile communication device may estimate the next signal strength reading from a wireless apparatus. For instance, if a mobile communication device receives signal strength readings of 45 dB, 43 dB, 41 dB, and 39 dB, the mobile communication device may expect to receive a signal strength reading of 37 dB as the mobile communication device and the wireless apparatus are separating at a constant rate of 2 dB/reading. The mobile communication device may estimate a speed of separation/approach from this data as well using the transmission power of the transmitter. Accordingly, an expected signal strength reading may be estimated or a number of expected signal strength readings may be determined. Additionally, based on the expected signal strength readings, a mobile communication device may determine whether the wireless apparatus and mobile communication device are moving away from each other, toward each other, staying the same distance, or whether an environmental issue is affecting the signal strength readings, by comparing an expected signal strength reading to a received signal strength reading.

The expected signal strength reading may be used to determine whether the system is being affected by environmental interference that does not accurately portray the separation distance between the wireless apparatus and the mobile communication device. For example, if a difference between received signal strength reading and an expected signal strength reading are substantially different, such that the likelihood that the difference is a result of legitimate movement of the element is very small, the system may know that an environmental change has affected the signal strength readings of the wireless apparatus. As such, the system may wait a predetermined time (e.g. "hold-off" time or "hold-off" period) to determine whether the environmental change is temporary or may adapt an alert threshold based on the new environmental settings to accurately portray the separation distance.

For example, if a user holding a mobile communication device (e.g. a phone running an object proximity tracking application) is moving away from a wireless apparatus attached to a camera at a steady rate of 2 dB/reading then the next expected signal strength reading would be 2 dB lower than the current value. However, if the next reading is 20 dB lower than the current value, a much larger magnitude change in signal strength readings has occurred than expected. The cause of such a drastic change may be that the items are moving away from each at a drastically increased rate or that an environmental aspect has changed such that the wireless communications are reaching the wireless apparatus with less power than previously due to interference from the environment. Such a change may occur because either the mobile communication device or the wireless apparatus has entered an area where wireless communication messages do not propagate as well (e.g. being in proximity of materials, bodies, or objects that detune the antenna or radio transceiver, etc.), something has interfered with the wireless communication message (an open door is closed), the transmission power has changed drastically (e.g. the system has entered a low power state), or one of the components in the system is malfunctioning (i.e. the reading is incorrect).

The mobile communication device may adapt to the environmental changes by raising or lowering the alert threshold if the mobile communication device determines that environmental factors are causing the disturbance in signal strength.

For example, if the difference between the expected signal strength reading and the received signal strength reading is larger than an allowed change value, the mobile communication device may calculate a threshold change value and may modify the alert threshold by the threshold change value to ensure no false alarms are triggered due to temporary or artificial environmental disturbance. Accordingly, the application on the mobile communication device may implement an adaptive alert threshold that may be raised or lowered depending on the received signal strength readings and an expected signal strength reading calculation.

An "alert threshold" may include a signal strength value corresponding to a predetermined safe proximity sensitivity setting for the system. For example, the alert threshold may be an RSSI value that is estimated to be a certain sensitivity level based on the transmission power of the system. For instance, if the safe proximity sensitivity setting for a tag is determined to be an intermediate sensitivity setting, the alert threshold may be set to an intermediate RSSI reading (e.g. −60 dB). The intermediate sensitivity setting may roughly correspond to a separation distance (e.g. 30 feet) in normal conditions based on the transmission power of the transmitter. However, the RSSI reading may not stay constant at −60 dB for a separation distance of 30 feet because the RSSI readings may be affected by transmission power and environmental interference. For example, a door may close between a tag and the associated mobile communication device that may affect the RSSI reading of the wireless apparatus without the distance between the wireless apparatus and the mobile communication device actually changing. For example, the RSSI reading may change to −70 dB at 30 feet away due to the interference of the door. As such, in order for the application to determine whether the tag and the mobile communication device are separated by 30 feet or a distance roughly comparable to the predetermined sensitivity setting, the alert threshold may be adaptable to incorporate environmental changes without alarming. Accordingly, the alert threshold may be adjusted according to the environment interference that the mobile communication device and wireless apparatus experience.

Accordingly, the object proximity tracking application may implement adaptive thresholds. On detecting a sudden drop in RSSI that is faster than a predetermined allowed change value, the alert threshold may be reduced by a calculated threshold change value. For instance, using the example of the door closing above, the change of −10 dB in one reading may be larger than a predetermined allowed change value that may be set to, for example, 5 dB per reading. If a tag were 25 feet away from the mobile communication device and the tag had been sending RSSI readings of −55 dB and suddenly the tag provided an RSSI reading of −65 dB, the difference between the expected RSSI reading of −55 dB and the received RSSI reading of −65 dB at the mobile communication device would be larger than the allowed RSSI change value of 5 dB/reading. Accordingly, the application may determine that an environmental factor has affected the RSSI readings. Furthermore, the application may calculate an alert threshold change value, for example −8 dB, and may change the alert threshold by the alert threshold change value. The alert threshold change value may be calculated through any suitable method including the use of averaging, regression analysis, analysis of previous environmental behavior, etc. Accordingly, the alert threshold may be lowered by −8 dB from −60 dB to −68 dB. Accordingly, the environmental changes that would have provided a false alarm since the tag was not more than 30 feet from the mobile communication device, are no longer causing the signal strength readings to be below the alert threshold value, and therefore the user is not alerted. However, the threshold may not be reduced to a level lower than is necessary to achieve radio connection. Additionally, the alert threshold may be raised if the signal strength readings are suddenly stronger than expected. However, the adaptive alert threshold may not be raised so high that a false alarm may be triggered by any separation or lowering of the signal strength readings. Additionally, there may be any number of sensitivity levels implemented by the application to allow a consumer to customize the estimated separation distance allowed between a wireless apparatus and mobile communication device prior to an alarm sounding.

Additionally, when the application determines that the signal strength reading is below an alert threshold, the application may wait for a predetermined period of time (e.g. a "hold-off" period or "hold-off" time) that allows any temporary disturbance to be abated, before alerting a user. Accordingly, before alerting a user that the alert threshold has been reached, the mobile communication device may determine if a predetermined number of previous signal strength readings for the wireless apparatus are below the alert threshold. The predetermined number of previous signal strength readings may be determined by the period between readings or through any other suitable means. For example, if a reading is taken every second, and the hold-off period is set as five seconds, the mobile communication device may wait to alert the user until the previous five signal strength readings are all below the alert threshold value. If the predetermined number of previous signal strengths readings are not below the alert threshold value, the mobile communication device may store the current signal strength reading in a memory and may wait for the next received signal strength reading before taking further action regarding the alert.

Additionally, in some embodiments, the application may implement a "buffer threshold" and delay alerting the user until the received signal strength reading breaches the buffer threshold. Due to environmental interference, RSSI readings may be inherently unpredictable and susceptible to variation that may be unrelated to movement of the wireless apparatus and/or the mobile communication device. As such, the application may implement a buffer threshold of a predetermined sensitivity level (e.g. 5 dB) where the alarm may only trigger if a received signal strength reading breaches the buffer threshold over the alert threshold. Accordingly, when the devices are close to being at the separation distance or limit of the sensitivity settings, the alarm may not constantly alarm due to environmental interference alone. For instance, using the example above, the alert threshold may be set to −60 dB but when the received signal strength readings are close to the −60 dB alert threshold level, the alarm may not be triggered until the received signal strength readings reach −65 dB. Accordingly, the mobile communication device may enter a warning condition when the received signal strength readings reach −61 dB and may not enter the alarm condition until reaching −65 dB. As such, if the mobile communication device and the wireless apparatus are close to the separation distance corresponding to −60 dB sensitivity setting (e.g. 30 feet), the signal strength readings may be −59 dB, −60 dB, −61 dB, −59 dB, −60 dB, −59 dB, etc. even though the mobile communication device and wireless apparatus are not moving. As such, if an alarm is triggered every time the alert threshold of −60 dB is crossed, a number of false alarms may be triggered. Accordingly, a buffer threshold of 5 dB may be implemented that ensures the application only enters an alarm condition when the mobile communication device and the wireless apparatus are clearly beyond the sensitivity settings corresponding to the alert threshold.

In embodiments of the present invention, a "power status" may include any indicator of the power level of an electronic device. For example, a power status may be a percentage of a power left in a power source, the amount of time left at average or current power use settings, an electrical gauging of the power level left in a power source, or any other suitable manner of indicating the amount of power left at a wireless apparatus. The wireless apparatus may determine the power status before sending signal strength readings to the mobile communication device and may include the power status in the wireless communication. Accordingly, the mobile communication device may track the power level of the tag and may update configuration settings for the wireless apparatus depending on the power status of the wireless apparatus. For example, if the power level is low, the mobile communication device may receive a power status indicator that informs the mobile communication device that the power status of the wireless apparatus is low. The mobile communication device may then update configuration settings for the wireless apparatus including a rate of transmission of signal strength readings, altering a transmission power of the wireless apparatus, entering the wireless apparatus into a low power state that may disable some functionality to ensure the primary functionality continues to operate, etc. The mobile communication device may send the updated configuration settings to the wireless apparatus in a wireless communication and the wireless apparatus may implement the configuration settings included in the wireless apparatus in order to conserve power.

In embodiments of the present invention, a "movement notification setting" may include a setting for an electronic device that when activated, the wireless apparatus may make periodic readings of a movement sensor and notify the mobile communication device anytime the sensor identifies movement that meets a certain threshold. For example, a user may configure a tag through the application such that the user indicates that the user would like to be notified if the wireless apparatus moves. Accordingly, if a movement sensor (e.g. accelerometer) in a wireless apparatus determines that the wireless apparatus is being moved, the wireless apparatus may include a movement indicator in the next wireless signal response sent to the mobile communication device. Additionally, the wireless apparatus may generate a notification message that is separate from the wireless signal response and is sent as soon as the movement occurs. Accordingly, embodiments of the present invention may determine a movement indicator from a wireless communication and may alert a user if the movement indicator indicates the wireless apparatus is moving.

In embodiments of the present invention, a "movement indicator" may include any suitable data that informs an electronic device that a wireless apparatus has sensed movement. For example, the movement indicator could be implemented as a flag, a sensor reading from a movement sensor (e.g. accelerometer), a message comprising particular information including location data, or any other suitable message that informs a mobile communication device that the wireless apparatus has sensed that it is being moved. The movement indicator may be sensor readings that require additional processing before a determination can be made of how the device is being moved or the processing may occur at the wireless apparatus and the mobile communication device may receive pre-processed data indicating the type of movement or that movement has occurred.

In embodiments of the present invention, "profile settings" may include any configuration settings for an electronic device that are tied to a user of the electronic device. For example, a user may be able to customize the configuration settings of a mobile communication device based on their profile settings. For example, a user may set default profile settings that are tied to configuration settings they originally provide an application during registration or initialization of the application. Accordingly, when the user adds wireless apparatuses to the mobile communication device for pairing, authentication, and connection, the profile settings may control the default configuration settings for the wireless apparatus. The configuration settings may include, for example, the sensitivity setting of the wireless apparatus corresponding to the alert threshold (where the sensitivity setting may roughly correspond to a separation distance in average environmental conditions), whether the wireless apparatuses should report movement indicators, the rate of transmission for the signal strength readings, transmission power of the wireless apparatus, etc. The profile settings may be temporarily altered or updated when the mobile communication device receives a wireless communication from a zone tag including zone settings.

In embodiments of the present invention, "zone settings" may include any configuration settings for an electronic device that are tied to a particular geographic location or electronic device. For example, a wireless apparatus may transmit a wireless communication including configuration settings for a mobile communication device. The zone settings may include configuration settings to be applied by the mobile communication device while receiving the wireless communication or may include a flag, signal, or other indicator that a predetermined setting stored in the mobile communication device should be activated while receiving the wireless communication including the zone settings. For example, a zone tag may transmit a "safe zone" message that informs a mobile communication device that the alert threshold should be lowered while receiving the safe zone message from the zone tag. Alternatively, the zone tag may transmit a "danger zone" message that may raise the security of the configuration settings while receiving the message. For example, in an open access area like an office, a zone tag may be located at the desk and transmit a "danger zone" message to the mobile communication device so that the user may be alerted any time any monitored objects are left behind or leave the heightened proximity settings of the user. Additionally, the configuration settings may maximize the throughput of the rate of transmission of the wireless apparatuses while the mobile communication device is in the danger zone. The mobile communication device may send the updated configuration settings to each wireless apparatus they are paired with or may customize which wireless apparatuses are affected by zone tagging. Accordingly, the mobile communication device may automatically change the profile settings for the mobile communication device when in areas that are known to be safe or dangerous without requiring the user to change any settings.

In embodiments of the present invention, "synchronizing" can include the initialization, pairing, and initial communication between two or more electronic devices. Synchronizing may include any one of the initialization, pairing, and initial communication between the electrical devices or may include all of the steps. Either way, once devices are synchronized, the devices may communicate requests, commands, and responses between each other.

A "data input" can include any input by a user on an electrical device. For example, the data input may be the touching of a particular area of a display screen that is configured to send a particular command to the processor of an electrical device (e.g. touch screen input) or may include the compression or engagement of a physical button or input on an electrical device (e.g. power button, volume up or down button, etc.). In embodiments of the present invention, data inputs may include commands to enter operational modes, engage or disengage features, control the volume, change screen display settings, navigate through an application or operating system, or may be used to provide consumer information including a password, as well as implementing any other features that may be useful in the present invention.

"Alerting a user" can include any actions taken by an electronic device to get a user's attention. For example, these actions may include generating audible alarms, physical vibrations, flashing lights, sending emails or short messages (SMS) or status updates (through social media websites like Twitter™) initiated from either wireless apparatus or the mobile communication device. The actions may be initiated by commands, messages, or signals generated by any of the devices. For example, an application on a mobile communication device may determine that a wireless apparatus has been separated further than an allowed signal strength sensitivity setting (corresponding to an estimated distance) and remains outside the sensitivity setting after a predetermined hold-off period or hold-off time. Accordingly, the mobile communication device may alert the user and may send an alarm command to the wireless apparatus. The wireless apparatus may enter an alarm condition that may include activating flashing lights, making a noise, vibrating, or any other action to get the user's attention. Additionally, the mobile communication device may enter the alarm condition and alert the user through the same methods. Additionally, in some embodiments where the wireless apparatus is meant to not be detected by others, the wireless apparatus may not enter the alarm condition and instead only the mobile communication device may alert the user. If the mobile communication device is in the user's pocket, hand, or within eye sight, the user may sense the movement, hear the noise, or see the flashing and may be alerted that the mobile communication device has entered an alarm condition based on a wireless apparatus being outside of a predetermined sensitivity level or setting. Additionally, the system may develop different alerting modes for different types of alarms (e.g. a proximity alarm may cause a chirping noise while an alarm related to completely losing contact with the wireless apparatus may cause a beeping noise, or different colored lights could be lit for each type of alarm, etc.).

I. EXEMPLARY SYSTEMS

FIG. 1 shows a block diagram in accordance to embodiments of the invention. Embodiments of the invention relate to proximity and object tracking system 100 comprising two parts: a mobile communication device 110 and a wireless apparatus in the form of a tag 140 attached to an object of interest (not shown). The monitored object may be any object that a user may desire to track, monitor, or be alerted to if the object is moved when in a stationary mode. Additionally, the user may desire to be alerted if the monitored object is separated from the mobile communication device such that signal strength readings from a wireless apparatus attached to the monitored object fall below a predetermined signal sensitivity level. For example, the monitored object may be a camera, a briefcase, a bag, car, car keys, computer, tablet computer, etc., with a tag attached to the monitored object and the mobile communication device may be a mobile phone or other portable communication device.

The mobile communication device 110 may comprise a processor device 111 (e.g. a microcontroller or microprocessor), a transceiver device 112, and an antenna 113 coupled to the transceiver device 112. The transceiver device 112 may be a chip, card, or any other device comprising both receiver circuitry and transmitter circuitry capable of sending and receiving communication messages using the antenna 113, and may implement any suitable communication protocol (e.g. Bluetooth™ Low Energy). The transceiver device 112 may be coupled to the processor 111. The processor 111 may also be coupled to a computer readable medium 120 comprising code for an object proximity tracking application 121 according to embodiments of the present invention. The computer readable medium 120 may further comprise storage for predicted status data 127 and history data 128. Additionally, the mobile communication device 110 may comprise an accelerometer 117, power supply 119A (e.g. battery), input elements 118 (e.g. buttons, switches, microphone, touch-screen, or any other input component) and output components (e.g. a speaker 116, a light emitting diode (LED), vibration element 119, etc.).

The object proximity tracking application 121 may comprise a signal strength module 122, a status determination module 123, a prediction module 124, a movement module 125, and a configuration module 126.

A signal strength module 122 may receive a wireless communication, determine the signal strength reading from the wireless communication, and may filter the signal strength reading to determine a usable signal strength reading (e.g. may filter a RSSI reading or other power indicator for a signal strength).

A status determination module 123 may determine whether the received signal strength indicator is above or below an alert threshold and whether the application 121 should alert a user in response to the received signal strength reading.

A prediction module 124 may generate an expected signal strength reading or expected signal strength threshold values based on previously received signal strength readings for a particular wireless apparatus. The expected signal strength may be determined through any suitable method as one of ordinary skill may recognize. Additionally, once the expected signal strength is determined, the prediction module 124 may store the expected signal strength in a predicted status database 127 or other storage location on the computer readable medium. The prediction module 124 may also determine if the wireless apparatus is moving toward the mobile communication device 110, away from the mobile communication device 110, or is stationary compared to the mobile communication device 110 and may store this determination in the predicted status storage 127 on the computer readable medium as well.

A movement module 125 may determine if a movement indication notification setting is active for a received wireless apparatus and determine whether a received wireless communication includes a movement indicator. Additionally, the movement module 125 may alert a user if such a movement indicator is present and the corresponding wireless apparatus is set in a stationary mode such that the user does not expect the wireless apparatus to be moving.

A configuration module 126 may determine settings and information about the status of the system and may update configuration settings for the wireless apparatus and profile settings of the mobile communication device 110 according to the system status. For example, the configuration module may determine the power status of a wireless apparatus and update configuration settings according to the power status. The configuration settings may include a transmission rate of signal strength readings for a wireless apparatus, a transmission power for the wireless apparatus, types of active notifications (e.g. a movement notification) for a wireless apparatus, etc.

The tag 140 may comprise a processor device 141 (e.g. a microcontroller or microprocessor), a transceiver device 142, and an antenna 143 coupled to the transceiver device 142. The transceiver device 142 may be a chip, card, or any other device comprising both receiver circuitry and transmitter circuitry capable of sending and receiving communication messages using the antenna 143, and may implement any suitable communication protocol. A crystal oscillator 148 may provide a clock for the transceiver device 142. The transceiver device 142 may be coupled to the processor 141. The processor 141 may comprise or may be coupled to a computer readable medium (not shown) comprising code for performing methods according to embodiments of the present invention. Additionally, the wireless apparatus 140 may comprise an accelerometer 147, a power supply 149 (e.g. battery), an input button 147, and output components 144, 145 (e.g. a speaker, a light emitting diode (LED), vibrating element, etc.). An exemplary embodiment of the tag 140 is shown in FIG. 4.

A processor (e.g. microcontroller or microprocessor) manages the operation of the tag 140 including pairing, connecting, and performing mutual authentication with a mobile communication device 110, responding to commands received from the mobile device, measuring and reporting the strength of a received radio signal from the mobile communication device 110, measuring and reporting a power status (e.g. voltage of a battery), reporting a movement indicator (i.e. the acceleration the tag 140 experiences during movement), and generating audio, visual, and mechanical indications and alerts. The tag 140 may authenticate itself to an object proximity and tracking application running on a mobile communication device 110 and may authenticate the proximity object tracking application as well. The tag 140 may report product and capability information to the application once authenticated. Additionally, the tag 140 may report radio telemetry and the button-press status to the application. The tag 140 may additionally actuate the LED and the buzzer by playing user-configurable audio.

Input button 147 may be a user interface that may allow the user to control the functionality of the wireless apparatus 140. For example, the input button 147 may activate certain functionality (e.g. pairing, mute, power, etc.) for the wireless apparatus 140.

Output components 144,145 may be any mechanisms for alerting a user (e.g. a buzzer, vibrator, LED light, etc.). For example, in FIG. 1 the output component 144 is a speaker and output component 145 is a LED. Any suitable output can be implemented and the output components may not be limited to those shown in FIG. 1.

Additionally, the wireless apparatus may require non-volatile storage for parameters, at least serial number and pairing information, and possibly also configurable settings such as beeper volume. For example, the transceiver 142 in the tag 140 may comprise flash memory (not shown) including up to two pages intended for storage of data. The processor 141 can erase and write to this memory. Although erasing and writing flash takes time, there is no problem with the tag 140 (or fob 130) being unresponsive to inputs for a short period. Therefore in the tag 140, the on-chip flash memory can likely be used for configuration settings. The transceiver 142 may further comprise an analog digital converter (ADC) that may be suitable for measuring the battery voltage.

Figure 2:
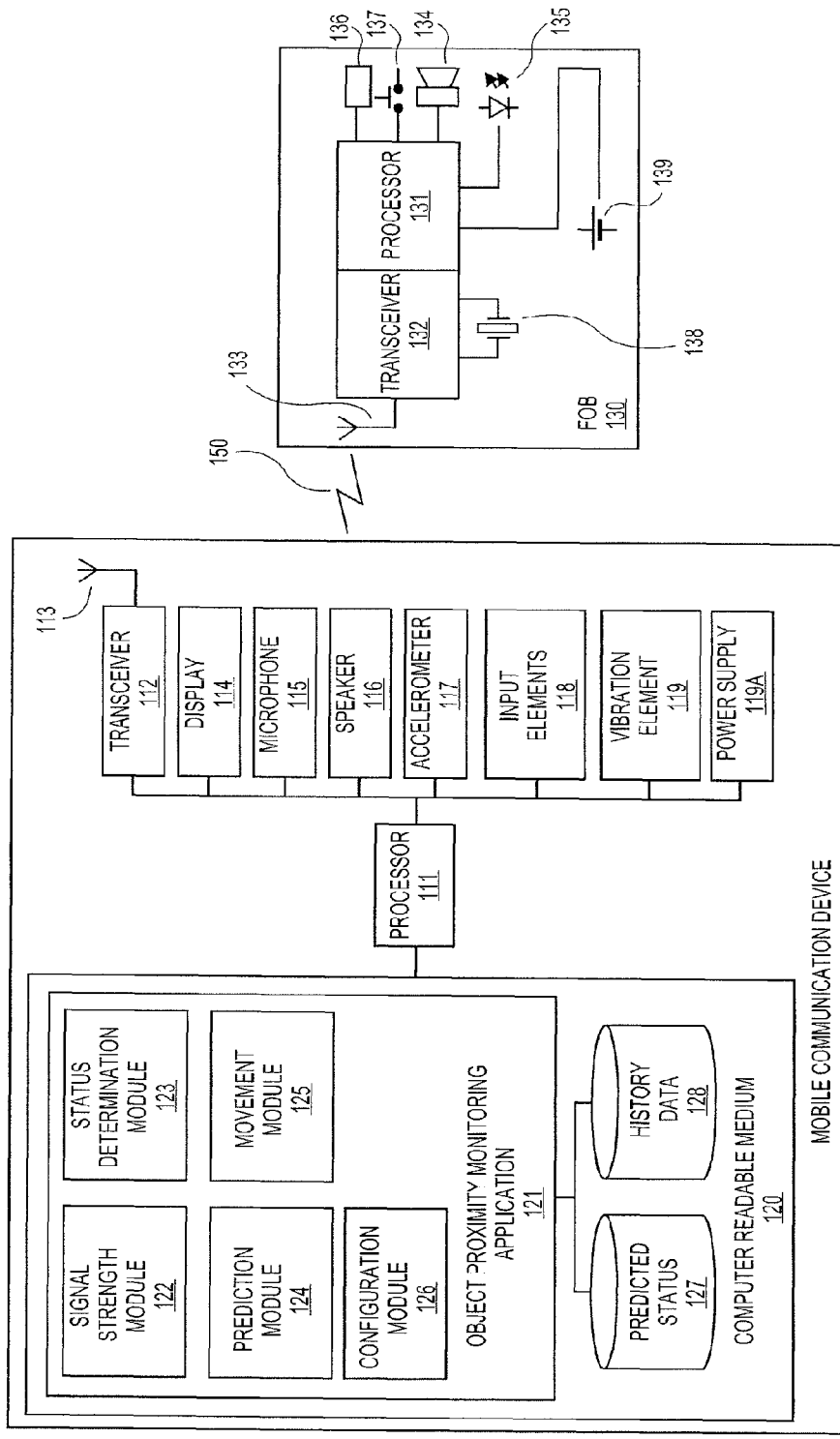
FIG. 2 shows another exemplary block diagram illustrating an object proximity and tracking system according to embodiments of the invention.

FIG. 2 shows an exemplary block diagram of a security system according to embodiments of the invention where the wireless apparatus is a fob 130. A fob 130 may comprise all of the functionality of the wireless apparatus in the form of a tag 140 but may also comprise additional components and functionality for tracking, paging, and notifying a user if the mobile communication device 110 moves out of a predetermined proximity from the fob 130. More details regarding the fob 130 functionality may be found in application Ser. No. 13/571,186, titled "Proximity Tag," filed Aug. 9, 2012, by Cavacuiti et al., which is incorporated herein in its entirety, for all purposes.

The wireless apparatus in the form of a fob 130 may comprise an input button 137 that activates a "find my phone" function on the wireless apparatus. Additionally, the fob 130 may comprise firmware or other computer readable medium that comprises code for performing a method that provides additional functionality over the tag 140 including security monitoring of the mobile communication device 110. The additional functionality may be described in further detail below. The wireless apparatus otherwise operates as described in reference to FIG. 1.

Figure 3:
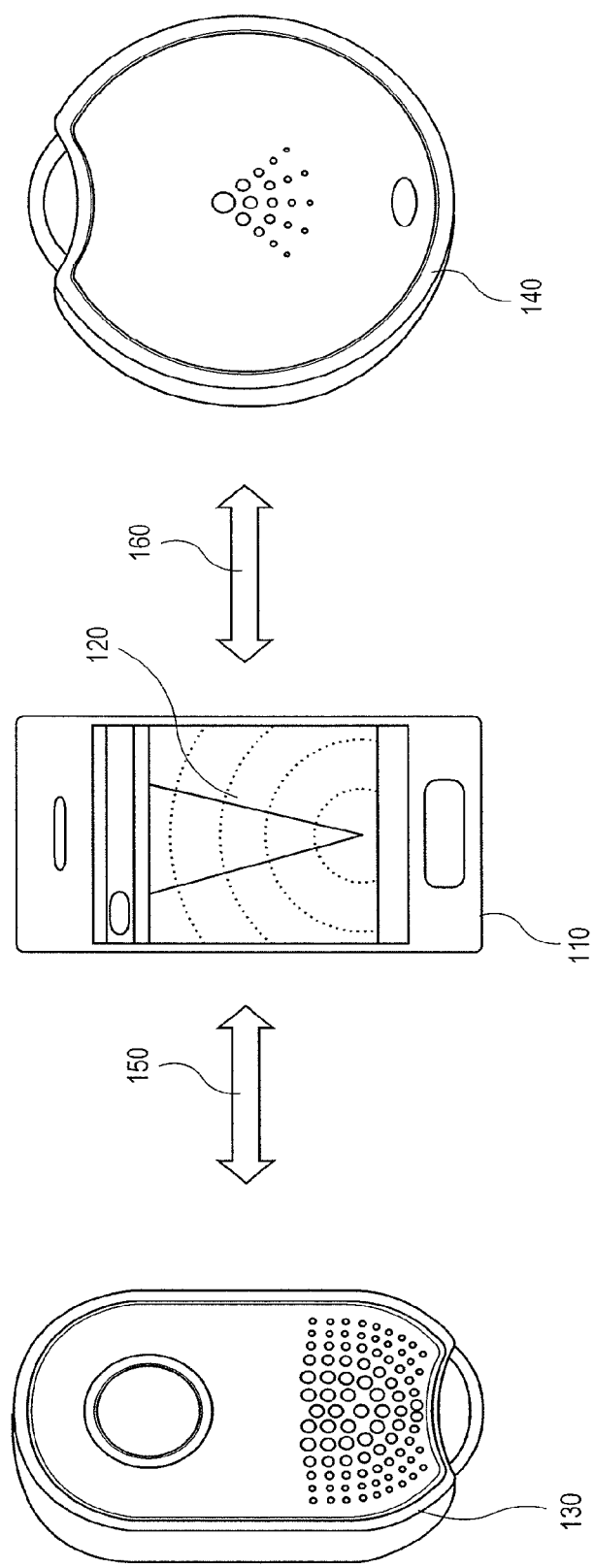
FIG. 3 shows a perspective view of a security system including exemplary embodiments of a wireless apparatus in the form of a fob, a wireless apparatus in the form of a tag, and a mobile communication device according to an embodiment of the invention.

FIG. 3 shows a perspective view of an exemplary embodiment of the object proximity and tracking system comprising a mobile communication device 110, a wireless apparatus in the form of a fob 130, and a wireless apparatus in the form of a tag 140. An exemplary screen shot of an object proximity tracking application 120 that may be used to initiate, configure, and operate the security system is being shown on the mobile communication device 110. The functionality, components, and operation of the tag 140, the fob 130, and the application 120 running on the mobile communication device 110 will now be described in further detail below.

Object Proximity Monitoring Application

The system has a software component (i.e. an object proximity tracking application) installed on the mobile communication device 110. The application is installed on the mobile communication device 110 and has a graphical user interface that, in conjunction with the device's physical user interfaces, provides controls over the system's behavior and displays information of the tags 140 and fobs 130. The application allows the user to interact and configure the tags 140 and fobs 130 and to configure mobile communication device 110 behavior in the context of the tags 140 and fobs 130. The application processes data received from the fobs 130 and tags 140 such as filtering the raw signal strength readings and determining if a tag 140 or fob 130 is outside of the preselected tracking zone. On detecting a tag 140 or fob 130 as being out of a preselected proximity range corresponding to an alert threshold, the application generates audio or visual indications or alerts (i.e. a separation alert). In some embodiments, alerts may also be issued if motion is detected by the tag 140 or fob 130 (i.e. a movement alert). The application may also record signal strength readings, received commands, time, date, and location of wireless apparatuses. The application may also notify the user when a tag 140 or fob 130 is out of transmission range and communications are no longer received by the mobile communication device 110. The application may provide the user with the ability to "page" a tag 140 or fob 130 by "beeping" the tag 140 or fob 130 to allow the user to find it, indicating to the user when and where the tag 140 or fob 130 was last in range, and generating a visual and/or audio alert to aid the user in locating the device (as well as functionality for ending such an alert or alarm). Additionally, the application may notify the user when the mobile communication device 110 is out of range by sending an alarm command to a fob 130 when out of proximity distance. Finally, the application may manage the pairing, connection, and disconnection between the mobile communication device 110 and the tags 140 or fobs 130.

Accordingly, the application serves as a configuration and status view tool for all authenticated and connected tags 140 and fobs 130, as well as to provide notifications in response to configured tag 140 or fob 130 related events. A tag 140 or fob 130 may be added to the system via the application user interface. Once added, the user may configure the application to interact with the tag 140 or fob 130 in different ways. The user may configure the application to notify the user when the tag 140 or fob 130 has moved out of a preselected proximity range, a transmission range, when the tag 140 or fob 130 has come back into range, or when the tag 140 or fob 130 has moved (through the use of an accelerometer on the tag 140 or fob 130). Additionally, the user may remove the tag 140 from the application, in which case the tag 140 may automatically return to an unpaired mode, ready to be paired again to the same, or another mobile communication device 110.

For the fob 130, the user may configure a custom out-of-range alarm to be played when the fob 130 is out of range of the mobile communication device 110. The user may also configure whether the fob 130 will vibrate and whether the alarm functionality is enabled or disabled.

Because the application is running on a mobile communication device 110 that a user may want to use for purposes other than the monitoring application, the application may be configured to run in the background while the mobile communication device 110 performs other services for a user. When the application is in the background, all of the proximity and alerting functions continue to work. However, instead of displaying the notifications within the application using custom visual indicators, standard system notifications may be used to seamlessly notify the user without interrupting other functionality of the mobile communication device 110. Exemplary screenshots of the application are shown in FIGS. 10-14 and further description regarding the user interaction with the application is provided below.

The Tag

According to some embodiments of the present invention, the wireless apparatus may be provided in the form of a tag 140. In some embodiments of the invention, the tag 140 may be as thin and as small as possible. Small dimensions allow the tag 140 to be easily attached to an object of any size without interfering with the use of the object. Additionally, smaller tags 140 may be inconspicuous and a malicious third party may not notice the tracking and proximity device attached to the monitored object. Alternatively, a user may wish to advertise the use of the tracking device to dissuade potential malicious third parties from trying to take the monitored object and as such, in some embodiments, the tag 140 may be provided in a larger form factor as well.

Figure 4B:
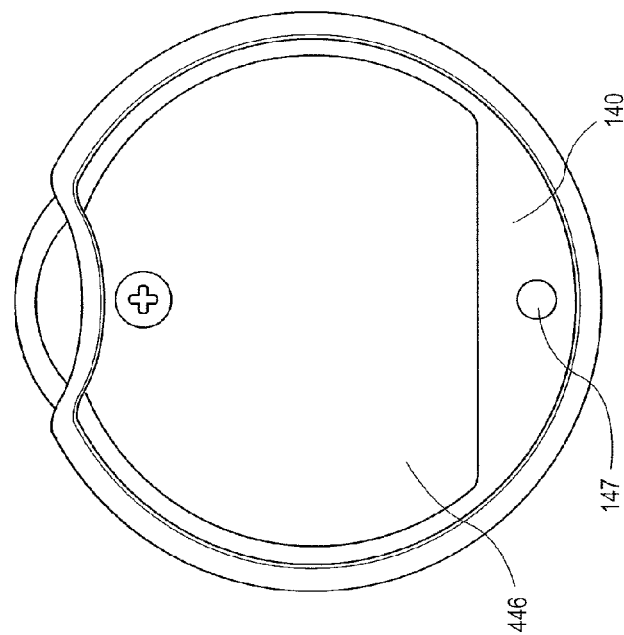
FIGS. 4A and 4B show perspective views of an exemplary wireless apparatus in the form of a tag according to an embodiment of the invention.
Figure 4A:
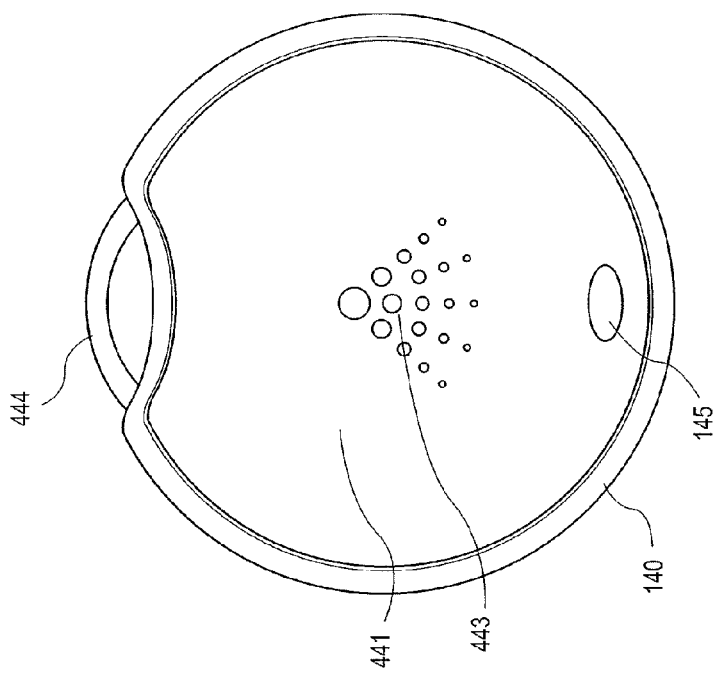

FIGS. 4A and 4B show perspective views of an exemplary tag 140 according to an embodiment of the invention. The tag 140 may comprise a front portion and a back portion of an outer case 441, an attachment device 444 (e.g. keychain hole), an input button 147 (e.g. pairing button), a battery compartment cover 446, and a status LED indicator 145. The keychain hole 444 may be physically coupled to the outer case 441. The keychain hole 444 allows a keychain or other attachment device to engage with the keychain hole 444 and attach the keychain to the first wireless apparatus. Any other configuration could also be implemented, for example, instead of a keychain hole, the attachment device 444 could be clip, bonding material, or any other type of attachment device configured to securably attach the tag 140 to an object of interest (not shown).

An input button 147 may control the pairing, power up and down of the transceiver, and may allow the user to interact with the tag 140 while alarming. In order to communicate with a mobile communication device 110, the tag 140 may pair with a mobile communication device 110. The input button 147 may comprise multiple functions including powering the transceiver on and off, muting the speaker when the tag 140 is alarming, providing pairing initialization functionality, and resetting the tag 140 to factory settings. The different functionality may be activated by pressing the input button 147 for different periods of time, causing a different type of input for each period of time. For example, the input button 147 may have a momentary input mode (B1), an intermediate input mode (B2), an extended input mode (B3), and a long extended input mode (B4) that may provide different input directions to the tag 140 depending on the period of time that the input button 147 is pressed. For instance, to initiate a pairing mode for the tag 140, the input button 147 may be pressed for an intermediate period of time (e.g. 3-6 seconds), while to power the transceiver of the tag 140 on and off (i.e. wake up or put the tag 140 to sleep), the input button 147 may be pressed for an extended period of time (e.g. 6-9 seconds). Additionally, if the input button 147 is pressed for a very long period of time (e.g. 20-23 seconds), the tag 140 may return to default factory settings. The different possible states for the tag 140 and fob 130 may be described in further detail below.

The status LED indicators may provide the user with information about the state of the tag 140, the connection and pairing status of the tag 140 with a mobile communication device 110, and the battery power status of the tag 140. For example, once the power status of the tag 140 drops below a predetermined power status threshold, the status LED indicators may flash red periodically (e.g. every 30 seconds) to remind the user to replace (or recharge) the battery. Additionally, when the input button 147 is pressed, the status LED indicator may inform the user as to the type of input entered. For example, if the input button 147 is only momentarily touched (e.g. for a period of less than 3 seconds), a first or momentary input may be activated and there may be no LED activity. Upon an intermediate input (e.g. input button 147 press for 3-6 seconds), the status LED indicator may flash green momentarily. Additionally, upon an extended input (e.g. input button 147 pressed 6-9 seconds), the status LED indicators may flash red momentarily. Finally, upon a long extended input (e.g. input button pressed 20-23 seconds), the tag may return to factory default settings and the status LED indicators may flash red and green intermittently. In this manner the user may know the type of input they have entered using the single input button 147. Additionally, under certain user actions, the tag 140 speaker may be activated to acknowledge the user action including upon activation of the pairing mode, upon successfully pairing the tag 140 to the mobile communication device 110, upon unsuccessful pairing of the tag 140, and finally, upon putting the tag 140 to sleep (e.g. powering down the transceiver).

The processor of the tag 140 may comprise firmware or may be coupled to a computer readable medium that comprises firmware or other code that is capable of performing a method of pairing, authenticating, and communicating with a mobile communication device 110 according to embodiments of the invention described herein. Accordingly, the firmware or other software components may be capable of authenticating the tag 140 and application, configuring and completing an alarm or other response to a "find my tag" command, determining and reporting signal strength indicator (RSSI) readings, determining and reporting power status of the tag 140, and in some embodiments, configuring and performing a security service including alerting a user if the mobile communication device 110 is out of a predetermined range.

Pairing and authentication of the tag 140 and the mobile communication device 110 may include a mutual authentication sequence that ensure the tags 140 and mobile communication devices 110 only communicate with tags 140 and mobile devices that are authorized to do so. The authentication procedure may include connection to a mobile communication device 110, receiving a pairing communication from the mobile communication device 110 including an authentication code, calculating an authentication code independently of the mobile communication device 110, verifying the authentication code received and calculated to ensure they match, and if the match, entering a connected state.

The connected state may indicate that the mobile communication device 110 is authenticated by the tag 140 but because the system implements mutual authentication, the mobile communication device 110 may now authenticate the tag 140 to ensure both devices are authorized to communicate. Accordingly, after authenticating the mobile communication device 110, the tag 140 may calculate a tag authentication code and send the tag authentication code to the mobile communication device 110. The application on the mobile communication device 110 may then independently calculate the tag authentication code and verify the received tag authentication against its own calculation. If they match, the tag 140 enters an authenticated state and the tag 140 and mobile communication device 110 may communicate normally. If the verification is unsuccessful at any point, the mobile communication device 110 and the wireless apparatus may not be authenticated but the wireless apparatus may stay in the connected state and generate a new authentication value to be authenticated by the application.

The tag 140 may further be configured to include "find my tag" or paging functionality where, when in range and authenticated with a mobile communication device 110 running the application, the application can issue a "find my tag" command, send the command in a wireless communication from the mobile communication device 110, that may cause the tag 140 to start playing a page melody. The page command may be implemented in any suitable fashion. For example, the page command may be a flag or other command included in a wireless communication that informs the wireless apparatus that the mobile communication device 110 is commanding the wireless apparatus to enter a paging mode. The paging mode includes the wireless apparatus to play the page melody for a predetermined period of time or until the user initiates the input button 147 to mute the page melody. Accordingly, the "find my tag" functionality may allow a user to quickly and easily find the tag 140 (and the attached object) by listening and following the page melody. Additionally, the user may be able to stop the find my tag functionality by engaging the "find my tag" data input through the application again, which may send a stop page command to the wireless apparatus that may end the page melody without requiring an input button 147 to be pressed on the tag 140.

The tag 140 may additionally generate and send signal strength readings to the mobile communication device 110 at a regular rate (i.e. a rate of transmission) that is determined in the configuration settings of the tag 140. Accordingly, the application running on the mobile communication device 110 may receive readings from the tag 140 at a periodic rate. In some embodiments, the calculated RSSI values are interpreted as the negated RSSI value. For example, a reading of 43 represents an RSSI of −43 dB. The RSSI may be calculated through any suitable method as one of ordinary skill in the art would recognize.

The tag 140 may send a periodic signal strength reading in a periodic wireless communication to the mobile communication device 110 or the mobile communication device 110 may request a reading from the wireless apparatus at a particular time. Additionally, events may cause the wireless apparatus to send a notification communication to the mobile communication device 110 even though the time for the generation of the periodic communication has not yet arrived. Accordingly, the wireless apparatus may save power by only periodically sending notifications of current location, signal strength readings, and other system status information but may also be capable of notifying the mobile communication device 110 when an event triggers a notification.

A notification may be triggered when the signal strength reading is above a signal strength notification threshold. For example, the tag 140 may be programmed to only provide notifications of a signal strength reading when the tag 140 is not a safe distance to the mobile communication device 110. Accordingly, the tag 140 may save power (e.g. battery life) because the tag 140 only sends notifications when the tag 140 is outside of a safe zone. Accordingly, the signal strength notification threshold may reduce the need to send frequent notifications in the event that the tag 140 is in a "safe zone" and the host does not need to know its signal strength readings.

Additionally, in some embodiments, a signal strength notification trigger may be implemented such that notifications are only sent once a large enough change in signal strength readings has occurred. For example, if the signal strength notification trigger equals 3 dB, the tag 140 may notify the mobile communication device 110 when the signal strength reading changes by a multiple of 3 dB, such as 0 dB, −3 dB, −6 dB, −9 dB, etc. (e.g. notifications are only sent when the signal strength readings change more than the signal strength notification trigger). In this manner, notifications may be limited to only those changes that are large enough to warrant a notification (i.e. small changes may not create notifications).

Additionally, the tag 140 may allow the application running on the mobile communication device 110 to monitor power status. This allows the application to keep the user informed of the battery status over a long period of time. Additionally, in order to limit transmissions, the wireless apparatus may only notify the mobile communication device 110 of the power status when the power status changes by a power status notification change value. For example, if the power status notification value is 45, the power status may notify the mobile communication device 110 when the remaining power level of the battery at the wireless apparatus changes by a multiple of 45 (i.e. when the power status is 55 and 10). Accordingly, the wireless apparatus may notify the user when the power status of above 55% indicates full, a power status of between 55 and 10 to indicate half full power, and 10% to indicate low power.

Additionally, the tag 140 may send device information to the application that is unique to the tag 140 and identifies the tag 140 to the mobile communication device 110. Accordingly, multiple tags 140 may be implemented with a single mobile communication device 110 and application.

The Fob

Another embodiment of the present invention includes a wireless apparatus in the form of a fob 130. A fob 130 provides all the functionality of the tag 140 described above but further includes functionality and components related to a security system for the mobile communication device 110.

The fob 130 can be kept with a user, such that it may be attached to a user's keychain or other object that is kept with the user for the majority of the time. Accordingly the fob 140 may alert the user if the user is separated from the mobile communication device 110. The functionality of the fob 130 is similar to that of the tag 140 but may periodically report the signal strength readings to the mobile communication device 110 and the fob 130 may receive a command to enter an alarm state if the signal strength readings go below a signal strength alert threshold as set by a user.

The fob's 130 purpose can be to alert the user in the event that the mobile communication device 110 is out of a signal strength sensitivity range of the user, preventing the user from accidently leaving his or her mobile communication device 110 behind. Typically, the fob 130 may send the signal strength readings to the mobile communication device 110 which determines that the fob 130 is out of range by comparing the received signal strength readings to a predetermined signal strength sensitivity setting, and sends an alarm command to the fob 130 to alert the user that signal strength readings from the fob 130 have reached a predetermined signal sensitivity setting (which is a rough estimate of separation distance between the fob 130 and the mobile communication device 110). The fob 130 may alert the user through a visual or audio indicator (e.g. flashing lights and playing audio) in the event the user has been separated from his or her mobile communication device 110. Additionally, the fob 130 may also alert a user if connection is lost with a mobile communication device 110 without receiving a command to alert from the mobile communication device 110. The fob 130 may also comprise a "find my phone" button that may page the mobile communication device 110. The mobile communication device 110 may then play a sound that the user can use to find the mobile communication device 110, much like the "find my tag" functionality described above.

Figure 5C:
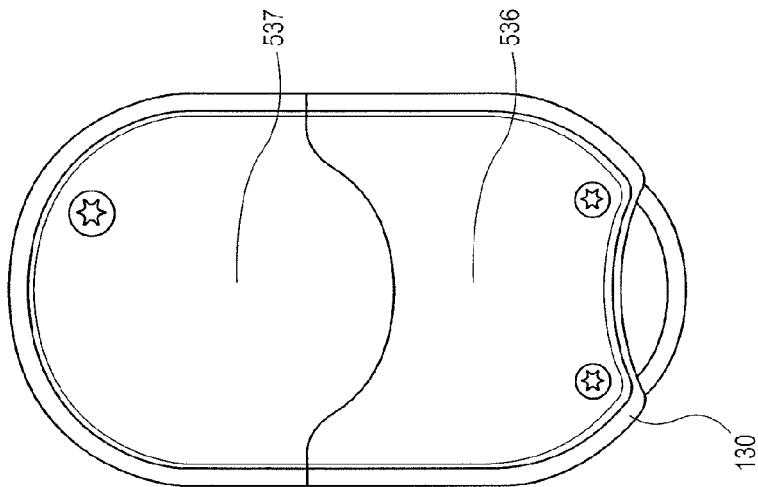
FIGS. 5A-5C show perspective views of an exemplary wireless apparatus in the form of a fob according to an embodiment of the invention.
Figure 5B:
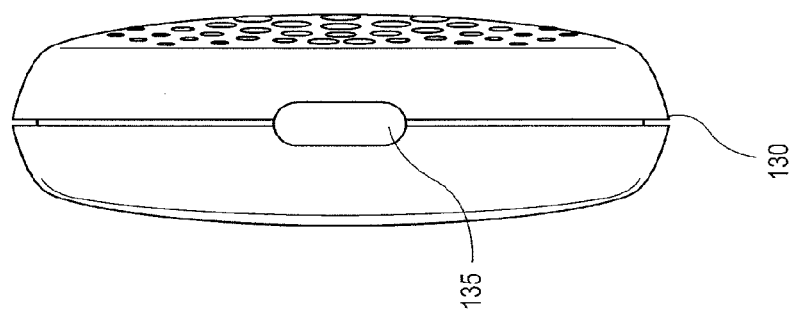
Figure 5A:
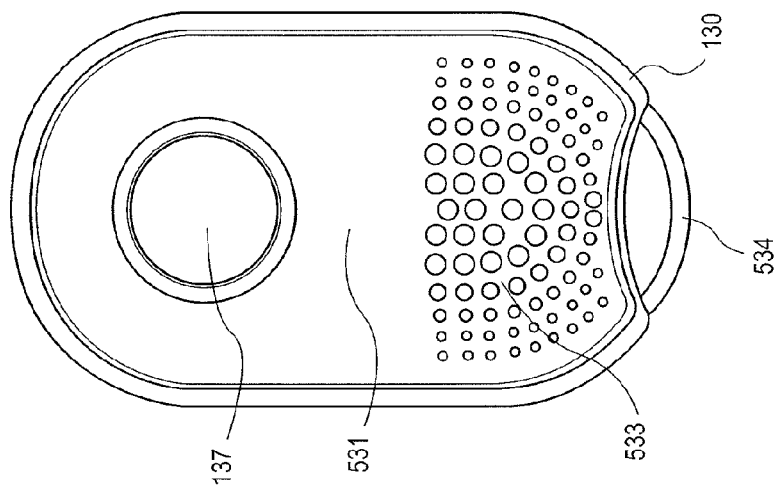

FIGS. 5A-5C show various views of an exemplary embodiment of a wireless apparatus in the form of a fob 130. According to embodiments of the invention, the fob 130 may be as thin and as small as possible. Smaller dimensions allow the fob 130 to be easily transported and carried by the user at all times without inconveniencing the user. Additionally, the fob 130 should be constructed appropriately so that it may be attached to a personal item that the user may always be in possession of and may not likely misplace. The fob 130 may also be constructed so that it may be attached to the clothing of a user (e.g. a belt clip that can be attached to a user's belt, pants, etc.) or attached to an accessory that may be worn by a consumer (e.g. a lanyard, tie clip, etc.).

A processor (microcontroller or microprocessor) manages the operation of the fob 130. Similar to the tag 140 described above, the operations include pairing with a mobile communication device 110, connecting to a mobile communication device 110, performing mutual authentication with the mobile communication device 110, responding to commands received from the mobile communication device 110, measuring and reporting the strength of the radio signal from the mobile communication device 110, measuring and reporting a power status (e.g. voltage) of the fob's power source, reporting the acceleration the fob 130 experiences and issuing commands and requests to the mobile communication device 110 as well as generating audio, visual, and mechanical indications and alerts. However, in addition to the functionality included in the tag 140, the fob 130 includes a "Find My Phone" function that may be activated through an input button 137. Additionally, the fob 130 is capable of alarming without being commanded by a mobile communication device 110 if the mobile communication device 110 is out of range of the fob 130.

The wireless apparatus in the form of a fob 130 may comprise all of the components of the wireless apparatus in the form of a tag 140 shown in FIGS. 4A-4B including a front and back case portion 531 and 536, LED indicators 135, a battery door 537, etc. However, as shown in FIG. 5A-5C, the wireless apparatus in the form of a fob 130 may further comprise a "find my phone" button 137 that is much larger and easier to use than the button on the tag 140. Similar to the input button 147 of the tag 140, the find my phone button may provide multiple inputs through a single button by the period of time that the input button 137 is compressed and the current state of the fob 130 when the input button 137 is pressed. For example, the button 137 may be used to pair to a new mobile communication device 110 if it is pressed down for an intermediate period (e.g. 3-6 seconds) but may activate the "find my phone" functionality if the input button 137 is momentarily compressed (e.g. 1-3 seconds). Additionally, if the input button 137 is compressed for an extended period (e.g. 6-9 seconds) the fob 130 may enter into a sleep mode. Finally, a user may clear an alarm by clicking the input button 137 during an alarm to acknowledge the notification.

The fob 130 may be entered into an armed or disarmed mode through the application running on the mobile communication device 110 once paired, connected, and authenticated. While the fob 130 is in an armed status, if the mobile communication device 110 moves out of range, tags 140 move out of range of the mobile communication device 110, or any other alert status is entered, the mobile communication device 110 may send a command for the fob 130 to alert the user through an alarm status. Additionally, if the mobile communication device 110 moves out of transmission range with the fob 130 and the fob 130 no longer receives wireless communications from the mobile communication device 110, the fob 130 may automatically enter an alarm status to notify the user of the separation.

Additionally, the alarm condition may comprise two periods, a warning condition and an alarm condition. The "warning condition" or "warning alarm" for the fob 130 may be activated before a full blown alarm condition is entered during a hold-off period or hold-off time so that a user may be alerted to the warning and may remedy the problem before an alarm is entered. In this manner, the user may be reminded of the separation without a full alarm being activated. The warning alarm may also be entered if the received signal strength from the fob reaches an alert threshold but has not reached a buffer threshold value that eliminates false alarms. Accordingly, the alarm condition may be entered once the signal strength readings cross the buffer threshold. The fob 130 may comprise two separate melodies, light patterns, or other different notification methods between the warning and alarm conditions.

The alarm functionality of the fob 130 reports signal strength readings to the mobile communication device 110 via periodic wireless communications. The mobile communication device 110 may compare the received signal strength readings to a user selectable signal strength alert threshold that is associated with an estimated allowable separation distance. The signal strength alert threshold may be above the signal strength required for the fob 130 to maintain a connection with the mobile communication device 110 and when the mobile communication device 110 determines that the fob 130 signal strength readings have dropped below the signal strength alert threshold, it may send a command to the fob 130 to start the alarm. The alarm may continue until either the user performs a momentary button press on the fob 130 or the mobile communication device 110 sends a second command to the fob 130 to stop the alarm. Alternatively, if the alarm functionality is enabled and the fob 130 disconnects from the mobile communication device 110, the alarm is also sounded. This process will be discussed in further detail below.

A single momentary press on the input button 137 may activate a "find my phone" feature. The "find my phone" feature may cause the fob 130 to send a command to the mobile communication device 110 to initiate alerts and alarms to help the user determine where the mobile communication device 110 is located. In some embodiments, the user may be notified of the distance to the mobile communication device 110 by the fob 130. The user may be notified through any suitable means including a voice informing the user through the output component speaker, distance displayed on a screen on the fob 130, or any other suitable means. The distance may be determined using the latest signal strength reading by the fob 130 or any other suitable means to estimate distance as one of ordinary skill in the art would recognize.

The fob 130 may use status LED indicators 135 as an output display to the user. There may be 3 color states: Red, Green, and Yellow (both Red and Green on together, piped). The status LED indicators 135 may inform the user of the current status of the system or the wireless apparatus, or may be used to inform the user of a warning condition or an alarm condition. For example, the status LED indicators 135 may flash an alternating pattern of red and green for two seconds when powering or starting up and may blink green three times when communication has been established between the fob 130 and mobile communication device 110 after powering up (i.e. once the mobile communication device 110 and the fob 130 are "paired"). The status LED indicators 135 may blink green once when the fob 130 enters an armed mode and may blink yellow once when the fob 130 enters a disarmed mode. Additionally, the status LED indicators 135 may blink red three times when the fob 130 is suspended as a result of a command from the mobile communication device 110. Furthermore, when the input button 137 is pressed to activate the "find my phone" functionality, the status LED indicators 135 may flash a green light once. Finally, when the battery is in a designated low or dying state, the status LED indicators 135 may blink every ten seconds to alert the user that the battery is low.

II. EXEMPLARY METHODS

In embodiments of the invention, the mobile communication device 110 continually sends wireless communications to a wireless apparatus in the form of a tag 140 or fob 130. The wireless apparatus may take a reading of the received communications and may return a wireless communication response including a signal strength reading to the mobile communication device 110 at regular intervals in continuous cycles or may wait for an event to occur based on the readings or for a command from the mobile communication device 110 to send a response. The messages may be encrypted and difficult to intercept or tamper with. If the fob 130 or the mobile communication device 110 loses contact with the mobile communication device 110, the mobile communication device 110 and/or the fob 130 may alert a user through a warning condition and alarm condition.

Wireless Apparatus Pairing, Authentication, and Connecting

Figure 6:
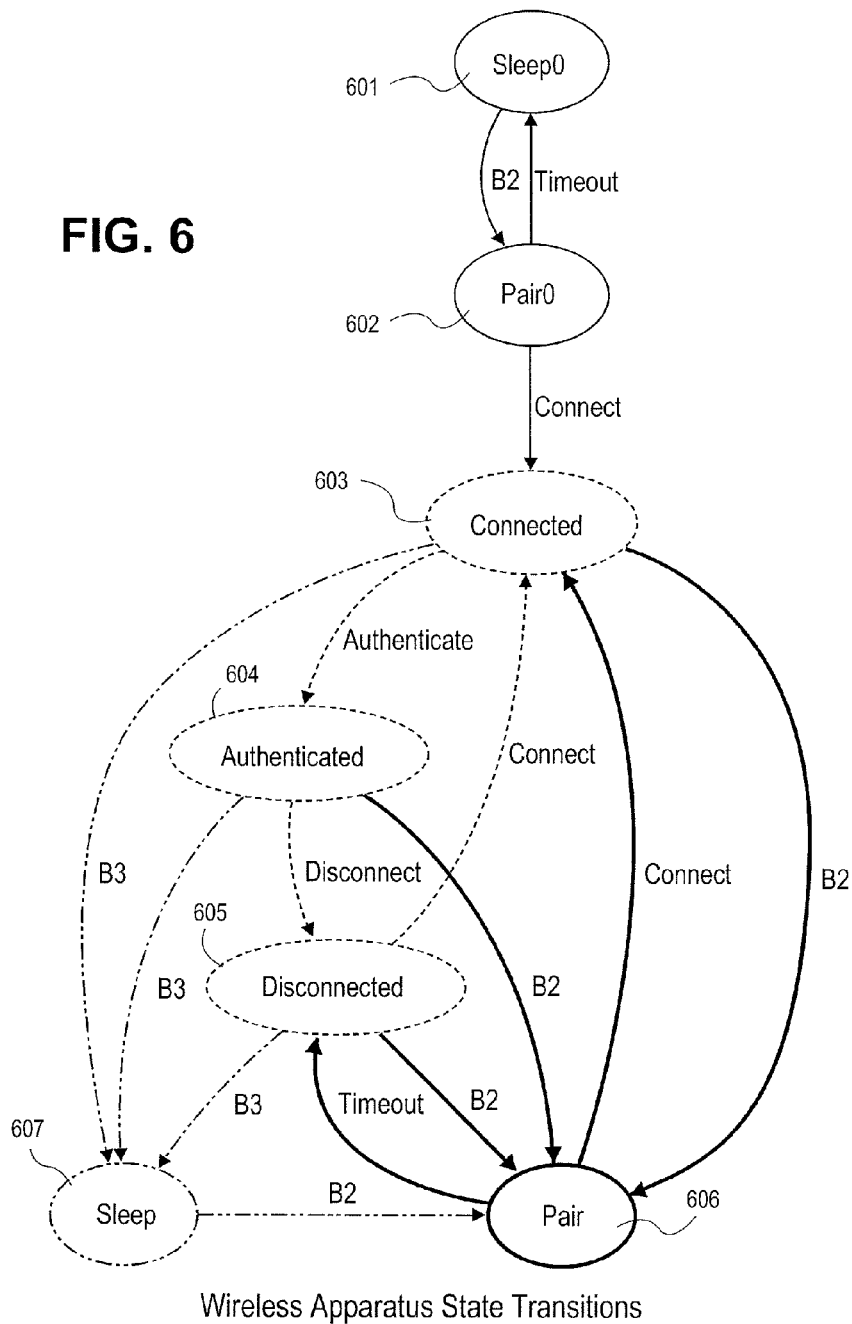
FIG. 6 show a wireless apparatus state transition diagram according to an embodiment of the invention.

In order for the wireless apparatus and the mobile communication device 110 to track and monitor objects of interest, the system may be initialized through the devices being paired, connected, and mutually authenticated. FIG. 6 illustrates the different hardware states that the wireless apparatus may enter in relation to the mobile communication device 110 according to embodiments of the present invention. The different states relate to initial powering up of the tag 140, a first pairing to a mobile communication device 110, connecting to the mobile communication device 110, authenticating to the mobile communication device 110 and being authenticated by the mobile communication device 110, disconnecting from the mobile communication device 110 and entering a sleep mode.

First, when the wireless apparatus is not connected to a mobile communication device 110, the wireless apparatus is in a sleep0 mode 601 in order to conserve power. The wireless apparatus may stay in the sleep0 mode 601 until a user activates the wireless apparatus or may wake periodically, try to pair, and go back to sleep0 mode 601. The sleep0 mode 601 is a special state where the tag 140 is dormant and there is no associated mobile communication device 110. This is the default setting when the tag 140 or fob 130 is manufactured and delivered to a user before connecting to any mobile communication device 110. Once a pairing occurs, the wireless apparatus 110 may remember the mobile communication device 110 last paired to and try to connect to that mobile communication device 110 whenever awake.

Next the wireless apparatus may enter a pair0 mode 602 in response to a pairing input through the input button (e.g. intermediate length compression on the input button 147 of FIG. 4 or 137 of FIG. 5) on the wireless apparatus. The pair0 mode 602 is entered upon the first attempt at pairing when no pairing has occurred previously and thus there is no associated mobile communication device 110.

During pairing, the wireless apparatus may advertise its presence to any available mobile communication devices 110 within pairing range. At this point, the user may connect the mobile communication device 110 and the tag 140 by adding the tag 140 through the application running on the mobile communication device 110. A timer is started during pairing such that the wireless apparatus advertise its presence with a pairing message for only a predetermined period of time. If no mobile communication device 110 connects to the tag 140 before the timeout, the tag 140 returns to the Sleep0 state 601. The LED indictor may flash a particular color (e.g. green) to remind the user that the tag 140 has started to advertise its presence to any available mobile communication devices 110 within pairing range.

During the advertising period, the object proximity and tracking application on the mobile communication device 110 may recognize the advertising message and may allow the user to add the tag 140 through pairing with the mobile communication device 110. Once successfully paired the status LED indicator may stop flashing, may change color, or may complete any other change to indicate to the user that pairing has successfully completed. Additionally, a melody may play that informs the user of the successful pairing. Alternatively, a red flashing light, a failure melody, or any other suitable indicator may be provided to a user if the pairing is not successful.

Once paired, the tag 140 may enter a connected state 603 because a mobile communication device 110 receives the advertised pairing messages and sends a connection message to the wireless apparatus after being added through the application by the user. If a mobile communication device 110 connects to the wireless apparatus while in the Pair0 602, Pair 606, or Disconnected states 605, the wireless apparatus records the ID of the mobile communication device 110 and thereafter only connects to the mobile communication device 110. The mobile communication device 110 has now established a connection to the wireless apparatus, however, the mobile communication device 110 and the wireless apparatus are not yet mutually authenticated. At this stage, all features are disabled except for authentication. As explained above in reference to the tag 140 and fob 130 sections, the wireless apparatus may now attempt to perform a mutual authentication. If the authentication process fails, it can be restarted at the beginning at any time.

The mobile communication device may now attempt to authenticate the wireless apparatus. If the wireless apparatus is successfully authenticated, the wireless apparatus receives a message from the mobile communication device and the wireless apparatus enters an authenticated state 604. The wireless apparatus and the mobile communication device 110 may now communicate and interact as designed, including providing the functionality described herein.

The wireless apparatus may also enter a disconnected state 605 any time that the mobile communication device 110 disconnects from the wireless apparatus. For example, the user may enter a data input into the application that the wireless apparatus should not be monitored. When the wireless apparatus is in the disconnected state 605, the wireless apparatus may periodically attempt to connect (e.g. automatically connect) to the mobile communication device 110. The user may use the application to change the auto-connect setting for the wireless apparatus such that the user may manually connect the wireless apparatus through the application or physically on the wireless apparatus instead of periodically trying to automatically connect with the mobile communication device 110. The automatic connect feature may attempt to connect at random periodic timing differences such that multiple wireless apparatuses do not attempt to connect to the mobile communication device 110 at substantially the same time.

Additionally, if the user inputs an intermediate input (B2) on the input button at any time, the wireless apparatus may enter the pairing state 606. The wireless apparatus may again start advertising its presence through pairing messages sent to any mobile communication device 110 within the pairing range. The user may add the tag 140 to any mobile communication device 110 within pairing distance by adding the tag 140 through the user interface of the application. Additionally, as before, if the tag 140 is not connected to mobile communication device 110 prior to a timeout period, the tag 140 enters into a disconnected mode 605 but remembers the last associated mobile communication device 110 and attempts to reconnect as described above.

Finally, if the user inputs an extended input (B3) on the input button at any time, the wireless apparatus enters a sleep mode 607. When entering a sleep mode 607, the wireless apparatus disconnects from the mobile communication device 110 and the transceiver of the wireless apparatus powers down until the user manually powers up the wireless apparatus or may sleep for a predetermined period of time such that wireless apparatus wakes up and attempts to connect and authenticate again after the period of time passes. The sleep mode 607 may be entered at any time through the user entering the sleep input (B3).

Proximity Alerts

In embodiments of the present invention, the mobile communication device 110 continually transmits wireless communications using any suitable communication scheme (e.g. Bluetooth™ Low Energy messages) to wireless apparatuses (tags 140 or fobs 130) that are connected and authenticated with the mobile communication device 110. An authenticated wireless apparatus periodically measures signal strength readings for messages received from the mobile communication device 110 using Received Signal Strength Indicator ("RSSI") readings. The RSSI readings are then sent to the mobile communication device 110 for processing.

RSSI is a measure of the signal strength of a wireless peer. The RSSI reading is roughly correlated to the distance of separation to a wireless peer and is used as the primary mechanism to estimate proximity in embodiments of the present invention. However, the RSSI reading is highly dependent on the environment, the transmitter, and the receiver. As such, processing of the signal is necessary to obtain a usable signal. Accordingly, the received signal strength readings may be processed by receiving the RSSI reading in a wireless communication from the fob 130 or tag 140 and filtering the RSSI reading through a low pass filter (e.g. n-tap low pass FIR filter). Any other suitable technique for determining the signal strength values received from the tag 140 or fob 130 and filtering the readings of noise may be implemented.

The mobile communication device 110 may receive the RSSI readings and an application running on the mobile communication device 110 may then filter the RSSI readings to reduce noise. The most recent filtered RSSI readings are then compared to predetermined values (e.g. thresholds) representing different degrees of proximity or proximity zones.

Figure 7:
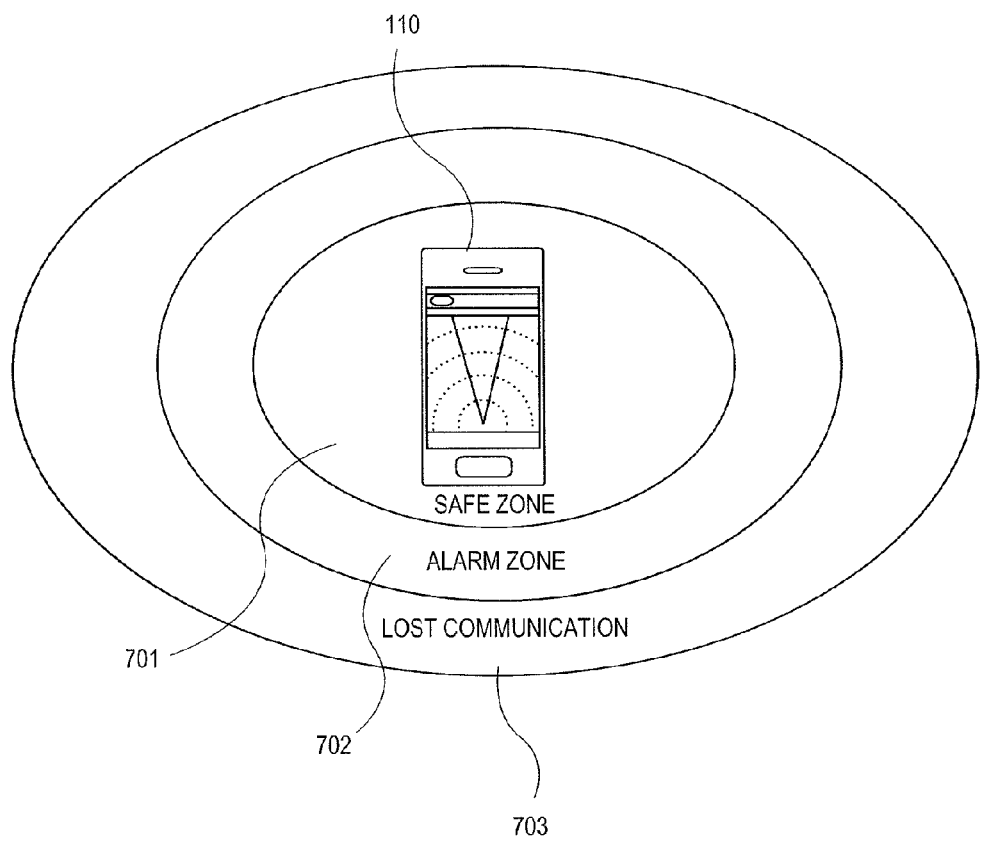
FIG. 7 shows a diagram of the different proximity status zones according to embodiments of the present invention.

FIG. 7 shows the proximity zones according to exemplary embodiments of the present invention. For example, the zone may be split into a safe zone 701, an alarm zone 702, and a lost communication (out of transmission range) zone 703. The object proximity monitoring application may determine that a tag 140 or fob 130 is in a safe zone 701 when the signal strength readings received from the tag 140 or fob 130 corresponds to a distance that is within a user-configurable range from the mobile communication device 110. When the mobile communication device 110 determines that the tag 140 or fob 130 is within the safe proximity distance, no alarm is triggered or alert provided to the user.

However, if the received signal strength readings indicate that the tag 140 or fob 130 is outside the safe zone 701 due to a signal strength reading being below a predetermined signal strength alert threshold, the application may determine that the tag 140 or fob 130 is in an alarm zone 702. However, before alerting a user, the application running on the mobile communication device 110 may wait a predetermined hold-off period to ensure the reading is not due to a temporary environmental change. If the signal strength readings are still determined to be below the signal strength alert threshold after the hold-off period has passed, the user may be alerted that the tag 140 or fob 130 is in the alarm zone 702 through the mobile communication device alarming the user. Additionally, in some embodiments, the application may implement a buffer threshold in addition to the alert threshold. The application may implement the buffer threshold to provide a range of signal strength values where the application either enters a warning condition or delays alarm until the signal strength readings are below the buffer threshold as well as the alert threshold. Additionally, in some embodiments, both a buffer threshold and a hold-off time may be implemented to minimize false alarms.

In order to avoid false alarms for temporary environmental effects on the RSSI readings, a threshold event may only be considered to have been triggered if the filtered RSSI reading has had its last crossing of the threshold boundary at least a predetermined number of samples ago. This provides a "hold-off" time which delays the alarming of the mobile communication device 110 until a predetermined period of time has passed or a predetermined number of samples have been accepted and are below the alert threshold boundary value.

Additionally, there are different types of notification or alerts for the user. For an approach alert, which is associated with an out of range device that alerts the user when the wireless apparatus enters back into a proximity range, the approach alert may use a rising edge threshold. A rising edge threshold means that the filtered RSSI reading may be higher than the alert threshold for a predetermined number of readings before the approach alert may be sounded. Alternatively, a separation alert may implement a lowering edge threshold which notifies the user once the predetermined number of RSSI readings are below the predetermined alert threshold.

According to embodiments of the present invention, once a threshold has passed, the event is considered "triggered" and may be reset before it may be triggered again. For example, once a tag 140 enters the alarm zone 702 for the requisite hold-off period and the separation alert is triggered, the alert may not continue to trigger after the user has acknowledged receipt of the separation alert. However, an event may be reset after the filtered RSSI readings have had its last crossing of the threshold boundary, in the opposite direction for the hold-off period. For instance, using the example above, the separation alert may be reset once the tag 140 enters back into the safe zone 701 for the hold-off period, and if the tag 140 were to subsequently leave the safe zone 701 for the requisite hold-off period, the separation alert may again be issued to notify the user. The boundary threshold (e.g. alert threshold) is determined by the user in the tag 140 configuration screens and are typically set in reference to a signal strength sensitivity setting instead of a RSSI value (e.g. "medium sensitivity" instead of −60 dB). Additionally, in some embodiments, an estimated distance may also be provided to help a user determine the desired sensitivity for the object. The estimated distance would be provided under average conditions for the system although this distance may change due to environmental disturbances.

Finally, if the status determination module of the object proximity monitoring application of the mobile communication device 110 determines that communication with the tag 140 or fob 130 has been lost, the tag 140 or fob 130 may have entered a lost communication zone 703. The status determination module may determine that communication is lost because the mobile communication device 110 may not receive the period notifications from the tag 140 or fob 130 at the regularly scheduled time period. The tag 140 and fob 130 regularly report signal strength readings, power status, a button press, current status, etc. at regular intervals. Accordingly, if the interval passes and the mobile communication device 110 has not received a wireless communication, the mobile communication device 110 may determine the tag 140 or fob 130 is in a lost communication zone 703. The mobile communication device 110 may send more communication requests to the wireless apparatus than is typical in a hope to re-establish communication and may alert the user that the mobile communication device 110 has lost contact with the tag 140 or fob 130.

Additionally, the wireless apparatus may start advertising its location in hopes of connecting with the mobile communication device 110 again. The application running on the mobile communication device 110 may also start listening for the wireless apparatus that has gone missing. In order to save battery, the rate of advertising signals sent when the wireless apparatus is separated from the mobile device may be time-limited such that after a time out, the rate at which the advertising signals are sent is low. If connection is not re-established after a set period of time, the fob 130 or tag 140 may decrease the advertising rate (longer period between advertisement transmissions) in order to conserve battery life.

Figure 14B:
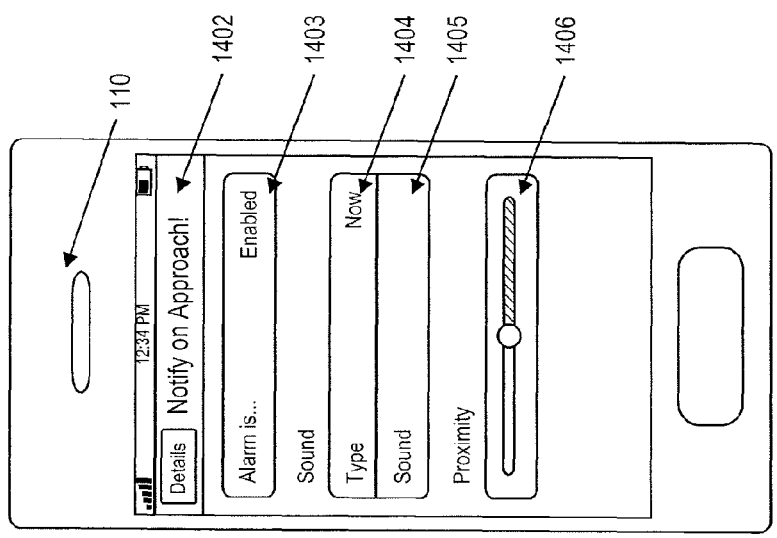
Figure 14A:
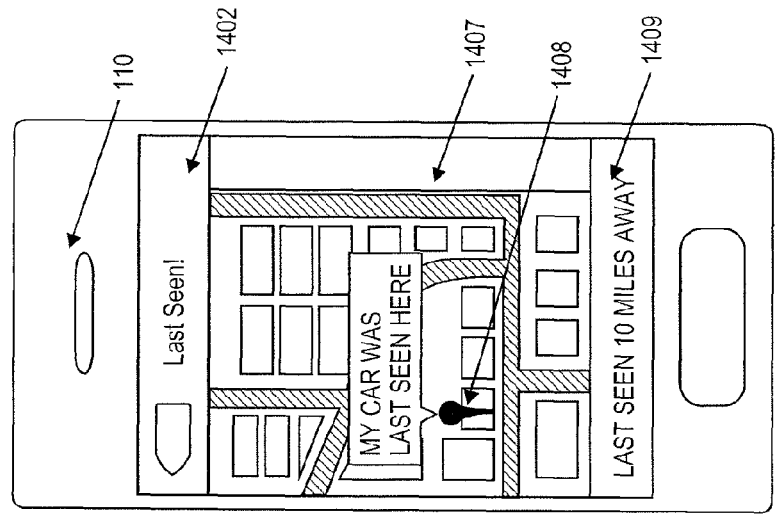

Furthermore, the object proximity and tracking application may initiate "last seen" functionality on the mobile communication device 110. The "last seen" functionality is shown in FIG. 14B. Additionally, the application may be configured to notify the user when the tag 140 or fob 130 enters communication range again through a "notify on approach" configuration setting. An exemplary screenshot of the settings for the "notify on approach" functionality is shown in FIG. 14A. These features will be discussed in further detail below.

Figure 8:
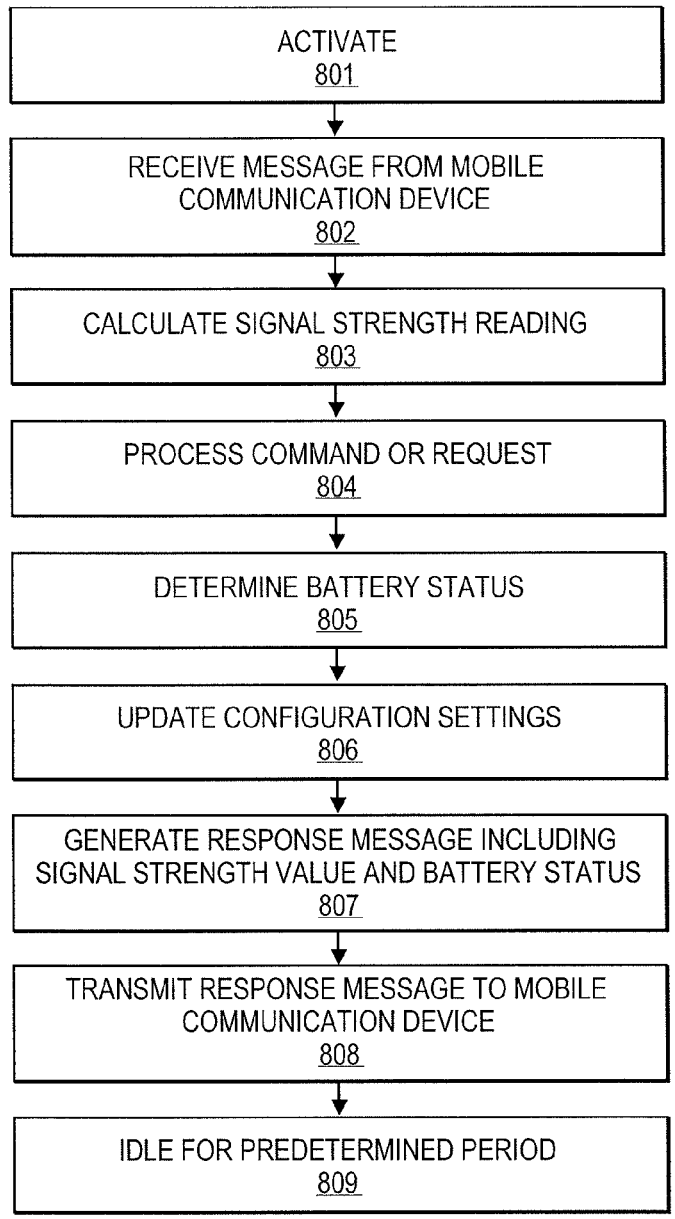
FIG. 8 shows a flowchart illustrating a method of a wireless apparatus according to embodiments of the invention.

FIG. 8 shows the wireless communication scheme of the wireless apparatus used in the proximity alert functionality according to one embodiment of the present invention. The method of FIG. 8 may be performed by either the fob 130 or the tag 140 while either apparatus is in an authenticated state with a mobile communication device 110.

In step 801, the wireless apparatus activates from a predetermined period of inactivity, idle, or rest. The wireless apparatus may not disconnect from the mobile communication device 110 but may not be active other than waiting for the next reading of a wireless communication from the mobile communication device 110. The wireless apparatus may enter an idle or inactive state in order to conserve battery power. However, in some embodiments the wireless apparatus may still be able to receive communications from the mobile communication device 110 and respond to any commands received in the wireless communications.

In step 802, the wireless apparatus receives a wireless communication request message from the mobile communication device 110. The wireless signal request message may comprise a command or may merely include identification information so that the wireless device may determine the signal strength of the wireless signal request message.

In step 803, the wireless apparatus calculates a signal strength value based on the received wireless communication. The signal strength may be calculated through a received signal strength indicator (RSSI) reading and calculation. The RSSI reading may be preprocessed and inverted such that it is a positive number (i.e. −60 dB reading is delivered as 60) or the raw RSSI values may be collected.

In step 804, the wireless apparatus processes a command or request within the wireless signal request. The wireless signal request may comprise a command to initiate a page status that alerts a user to the wireless apparatuses location, or may command the wireless apparatus to disconnect from the mobile communication device 110 and enter a disconnected state. Any other suitable command may be included in the wireless signal request.

In step 805, the wireless apparatus determines a power status of the power supply for the wireless apparatus. The power status may be a reading of the current battery power of the wireless apparatus, the amount of charge left at average usage, or any other power status indicator.

In step 806, the wireless apparatus updates configuration settings according to information included in the wireless communication. The wireless signal request may comprise a change of configuration settings for the wireless apparatus based on the previously sent wireless response message sent to the mobile communication device 110, a data input by a user, or the entering of a zone tag area that automatically changes the profile settings for the mobile communication device 110. Accordingly, the mobile communication device 110 may update the configuration settings of the wireless apparatus at any time by sending the updates embedded within wireless signal requests.

In step 807, the wireless apparatus generates a response message including the signal strength reading and the power status. The wireless apparatus may also include any other suitable information in the wireless response message including commands (e.g. a "find my phone" command), location information (e.g. triangulation information, longitude/latitude coordinates from a GPS component, etc.), time, date, device identification information, special requests, etc. Any suitable information may be included in the wireless signal response as one or ordinary skill in the art would recognize.

In step 808, the wireless apparatus transmits the response message to the mobile communication device 110 and in step 809, the wireless apparatus goes into an idle or inactive state for a predetermined period. The period of the idle or inactivity may be included in a configuration setting as the rate of transmissions of the signal strength readings for the wireless apparatus. The lower the rate of transmissions of wireless communications including the signal strength readings, the longer the battery power may allow the wireless apparatus to operate without charging or replacing of a power source. The wireless apparatus may then repeat this cycle by activating when the next cycle begins (step 801).

Adaptive Alert Thresholds

Figure 9:
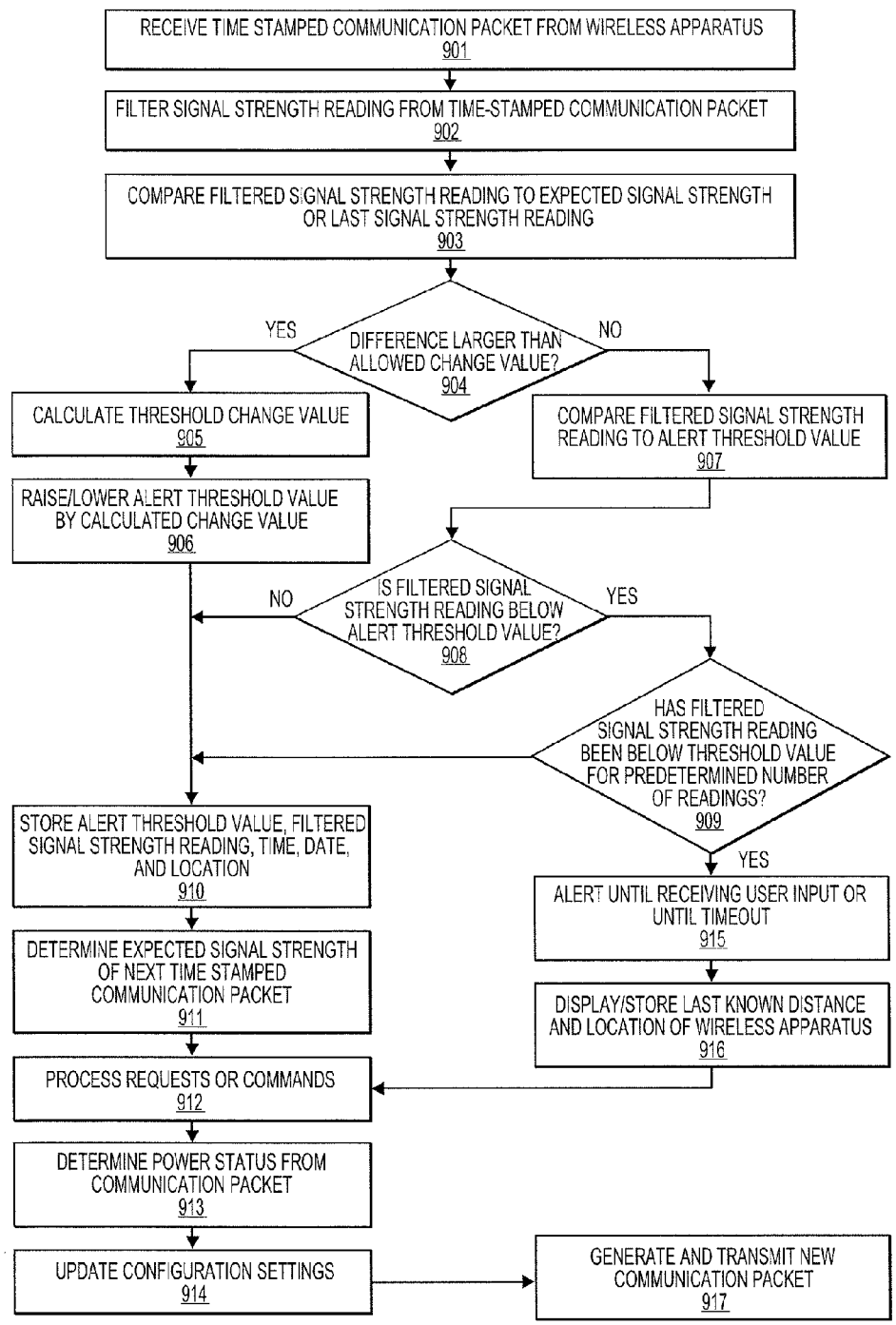
FIG. 9 shows a flowchart illustrating a method of proximity detection performed by a mobile communication device according to embodiments of the invention.

FIG. 9 shows a method of monitoring a wireless apparatus for determining whether a proximity alert needs to be generated using adaptive alert thresholds. As explained previously, the application may incorporate adaptive alert thresholds because signal strength readings may be dependent on environmental and system variables that may change the signal strength reading at any given time without a corresponding change in separation distance. Accordingly, without incorporating adaptive alert thresholds or a similar adaptive quality, false alarms may result from environmental and system power changes.

In step 901, the mobile communication device 110 receives a time stamped communication packet from the wireless apparatus. The time-stamped communication packet may be received in a wireless signal response and may comprise the latest signal strength reading, information related to a device identifier for the wireless apparatus, commands from the wireless apparatus, responses to previously sent commands from the mobile communication device 110, location, time, and any other suitable information that may be used in embodiments of the present invention.

In step 902, the mobile communication device 110 filters the signal strength reading determined from time-stamped communication packet. For example, the mobile communication device 110 may receive a RSSI reading in response to a previously sent wireless signal request. RSSI is a measure of the signal strength of a wireless peer and is roughly correlated to the distance of separation to a wireless peer. However, processing of the RSSI data may be necessary to obtain a usable signal. Accordingly, the received signal strength readings may be processed by filtering the RSSI reading through a low pass filter (e.g. n-tap low pass Finite Impulse Response (FIR) filter or Butterworth Infinite Impulse Response (IIR) filter). Any other suitable technique for determining the signal strength values received from the tag 140 or fob 130 and filtering the readings of noise may be implemented.

In step 903, the mobile communication device 110 compares the filtered signal strength reading to an expected signal strength or a last signal strength reading. Once the RSSI reading is filtered and a signal strength reading is determined by the mobile communication device 110, the application running on the mobile communication device 110 determines a stored expected signal strength reading that was calculated at the end of the last cycle, and compares the received signal strength reading to the expected signal strength reading. The application calculates the expected signal strength reading using previous signal strength readings from the wireless apparatus. Accordingly, the prediction of the signal strength status may be used to determine if the wireless apparatus is moving away from the mobile communication device 110, toward the mobile communication device 110, or is stationary in relation to the mobile communication device 110. As explained previously in the definitions section, the expected signal strength may be predicted based on the periodic past signal strength readings and what may be gradual changes in signal strength reading values. Accordingly, the signal strength reading may be compared to the expected signal strength to determine if the signal strength readings change drastically.

In step 904, the mobile communication device 110 determines whether the difference is larger than an allowed change value. Accordingly, the difference between the expected signal strength reading and the received signal strength is used to determine if a drastic change has occurred. A change in signal strength could indicate separation, physical blockage or detuning of the antenna. Accordingly, a method of disambiguation may be implemented to ensure false alarms do not regularly annoy a user. If the change value is determined to be larger than an allowed change value, the system may assume that the environment has changed in a substantial manner and thus the system may move to step 905 to adaptively alter the alert threshold to adapt to the changed environment.

In step 905, If the difference magnitude is larger than an allowed change value, the application running on the mobile communication device 110 may calculate a threshold change value. The threshold change value may be calculated through any suitable method including using averaging of the difference, using the difference between the expected signal strength reading and the actual signal strength reading, offsetting the readings by a standard value, using past threshold change values, etc.

In step 906, the alert threshold is raised or lowered by the threshold change value based on whether the difference was higher or lower than the expected value. Typically, the calculated threshold change value should be large enough that the alert threshold is not breached by the received signal strength reading unless the expected signal strength reading anticipated such a result.

In step 907, if the difference is not larger than the allowed change value, the mobile communication device 110 compares the filtered signal strength reading to an alert threshold value. The threshold change value is not calculated because the difference between the expected signal strength reading and the actual received signal strength is a reasonable value that does not indicate a drastic change to the environment of the system. Accordingly, the proximity alert system continues with the analysis of determining whether the wireless apparatus is outside of the safe zone 701. Although the exemplary embodiment shown in FIG. 9 does not continue with the comparison of the filtered signal strength reading and the alert threshold value described in step 907 if the difference magnitude is larger than an allowed change value, in some embodiments, after offsetting or changing the alert threshold, the filtered signal strength reading may be compared to the new or updated alert threshold value to determine if an alarm should be issued.

In step 908, the wireless communication device determines if the filtered signal strength value is below an alert threshold value. If the received signal strength reading is below (or above depending on whether the signal strength readings are negative or positive) the alert threshold value and thus indicates that the wireless apparatus is in an alarm zone 702, the analysis moves to step 909 to determine how long the alert threshold has been breached. However, if the signal strength value is not below or breaching the alert threshold, the proximity analysis process is completed and the application can continue the configuration and management of the system without alerting the user.

In step 909, if the filtered signal strength value is below the alert threshold value, the mobile communication device 110 determines if a predetermined number of readings have been below the threshold value. The predetermined number of readings corresponds to a "hold-off" time that delays an alert until a number of samples are below an alert threshold value. As explained above in reference to FIG. 7, the user is only alerted if the wireless apparatus stays over the alert threshold for a "hold-off" period. Accordingly, if the alert threshold has not been breached for the corresponding hold-off period, the analysis may be completed, the results may be stored and the application may wait until the requisite hold-off period is met before alerting the user.

In step 910, if the filtered signal strength reading is not below the alert threshold value, the alert threshold value was altered due to a difference between the expected and received signal strength reading being too large, or the predetermined number of filtered signal strength readings have not been below the alert threshold value, then the mobile communication device 110 stores the alert threshold value, the filtered signal strength reading, the time, date, and location information (if included in the wireless communication packet) in a history data storage in the mobile communication device 110.

In step 911, the mobile communication device 110 determines the next expected signal strength reading based on the stored values and stores the expected signal strength reading in a predicted status storage area on the computer readable medium. As explained in the definitions section, the expected signal strength may be predicted accurately due to the periodic readings received by the mobile communication device 110. The expected signal strength reading may be used in the next cycle to determine if the received signal is being affected by outside factors such as environmental or power changes.

In step 912, the mobile communication device 110 determines if the wireless communication packet contains any requests or commands from the tag 140 or fob 130 (e.g. a "find my phone" paging command). If so, the application performs the requested commands.

In step 913, the mobile communication device 110 determines the power status of the wireless apparatus if it is included in the wireless communication. The power status indicator informs the application of the power level of the battery of the wireless apparatus. Depending on the power status level, the mobile communication device 110 may update the configuration settings for the wireless apparatus including transmission rate.

In step 914, the mobile communication device 110 determines if any configuration settings need to be updated based on the received power status and the expected signal strength. The application may then update the configuration settings and include the configuration settings in the next wireless signal request sent to the wireless apparatus. A number of configuration settings on the wireless apparatus may be updated in order to save power for the wireless apparatus, increase the accuracy or sensitivity of the system, and further increase the effectiveness of the system. For example, if the application determines that the wireless apparatus has a low power status, the application may decrease the rate of transmission for the wireless apparatus to a lower rate to further conserve battery power. The configuration settings may include a rate of transmission of wireless communications for the wireless apparatus, a transmission power for the wireless apparatus, a notification type setting, and a movement notification setting for the wireless apparatus.

Reducing the rate of transmission of wireless communications for the wireless apparatus extends the battery life of the wireless apparatus as the sleep period is longer and fewer power consuming activities occur in a particular period of time. Accordingly, if the power status of the wireless application is low, the application may update the rate of transmission in the configuration settings for the wireless apparatus to increase the period of wait between reading and transmitting the signal strength values in response to the wireless signal request. Accordingly, the wireless apparatus may perform fewer signal strength measurements and send fewer wireless signal responses which may extend battery life.

Additionally, an algorithm in the application determines if the wireless apparatus is proximal and if it is approaching or departing. The report transmission rate is increased if the fob 130 or tag 140 is far or moving away because there is a higher chance that a separation alert may be issued soon and that the monitored object is in a danger condition. Additionally, the rate of transmission may be decreased if the wireless apparatus is near or moving closer to the mobile communication device 110.

Reducing the transmission power extends the power source life of the wireless apparatus. Accordingly, an algorithm in the application determines if the fob 130 or tag 140 is proximal and if it is approaching or departing from the mobile communication device 110. Accordingly, the application may update the configuration settings including the transmit power of the wireless apparatus to an increased level if application determines that the fob or tag 140 is far or moving away. Alternatively, if the wireless apparatus is approaching or is close to the mobile communication device 110, the application may decrease the transmission power in the configuration settings for the wireless apparatus. Additionally, the power status may be used to determine the aggressiveness of the transmission power settings. For example, if the power status of the wireless apparatus is at a high level, the system may only limit the transmission by a small amount if the wireless apparatus is moving toward the mobile communication device 110. However, if the power status of the wireless apparatus is very low, the application may limit the transmission power setting for the wireless apparatus as much as possible to maximize the available remaining power.

In step 915, if the predetermined number of previous signal strength readings are below the alert threshold value, the mobile communication device 110 alerts the user until the user provides an input that acknowledges the alarm or until the alarm timeout period is exhausted.

In step 916, the mobile communication device 110 stores the last known distance and location of the wireless apparatus as well as the other data as shown in step 910. Additionally, the process may now return to step 910, 911, or 912 and continue storing, determining the expected signal strength, processing requests or commands, etc.

Finally, in step 917, the mobile communication device 110 generates and transmits a new wireless signal request including any appropriate information including any possible updates to the configuration settings for the wireless apparatus, commands, etc.

Although not shown in FIG. 8 or FIG. 9, the wireless apparatus may further comprise a step of determining whether the configuration settings indicate that a movement notification setting is active, and if so, the wireless apparatus may determine if the movement sensor (i.e. accelerometer) within the wireless apparatus has indicated any movement since the last wireless signal response. If so, the wireless apparatus may include a movement indicator in the wireless response message sent to the mobile communication device 110. As explained previously, the movement indicator could be implemented as a flag, a sensor reading from a movement sensor (e.g. accelerometer), a message comprising particular information including location data, or any other suitable message that informs a mobile communication device 110 that the wireless apparatus has sensed that it is being moved. The movement indicator may be sensor readings that require additional processing before a determination can be made of how the device is being moved or the processing may occur at the wireless apparatus and the mobile communication device 110 may receive pre-processed data indicating the type of movement or that movement has occurred. Accordingly, the wireless apparatus may determine if it is being moved and if so, may send a movement notification in the wireless signal response to the mobile communication device 110. Additionally, the wireless apparatus may send the movement indicator outside of wireless signal response message if it determines that the movement is occurring before the next wireless signal response message is due to be sent.

Exemplary Screenshots of Embodiments of the Application

As described previously, in some embodiments of the invention, the system may have a software component (i.e. application) installed on a mobile communication device 110. The user interface of the object proximity tracking application provides controls over the system's behaviors and allows a user to customize the system to maximize its effectiveness. For instance, the distance from the mobile communication device 110 that the safe zone 701 extends, the definitions of alarm conditions (e.g. alarm on movement of the wireless apparatus), and the system's responses to alarm conditions may be defined and configured by the user using the application running on the mobile communication device 110.

The application may synchronize the mobile communication device 110 and the wireless apparatus, receive a data input from a user, and update the wireless apparatus with information corresponding to the data input. The data input may correspond to configuration settings for a wireless apparatus. The application may update the configuration settings and then include the configuration settings in the next wireless signal request sent to the wireless apparatus.

Figure 10:
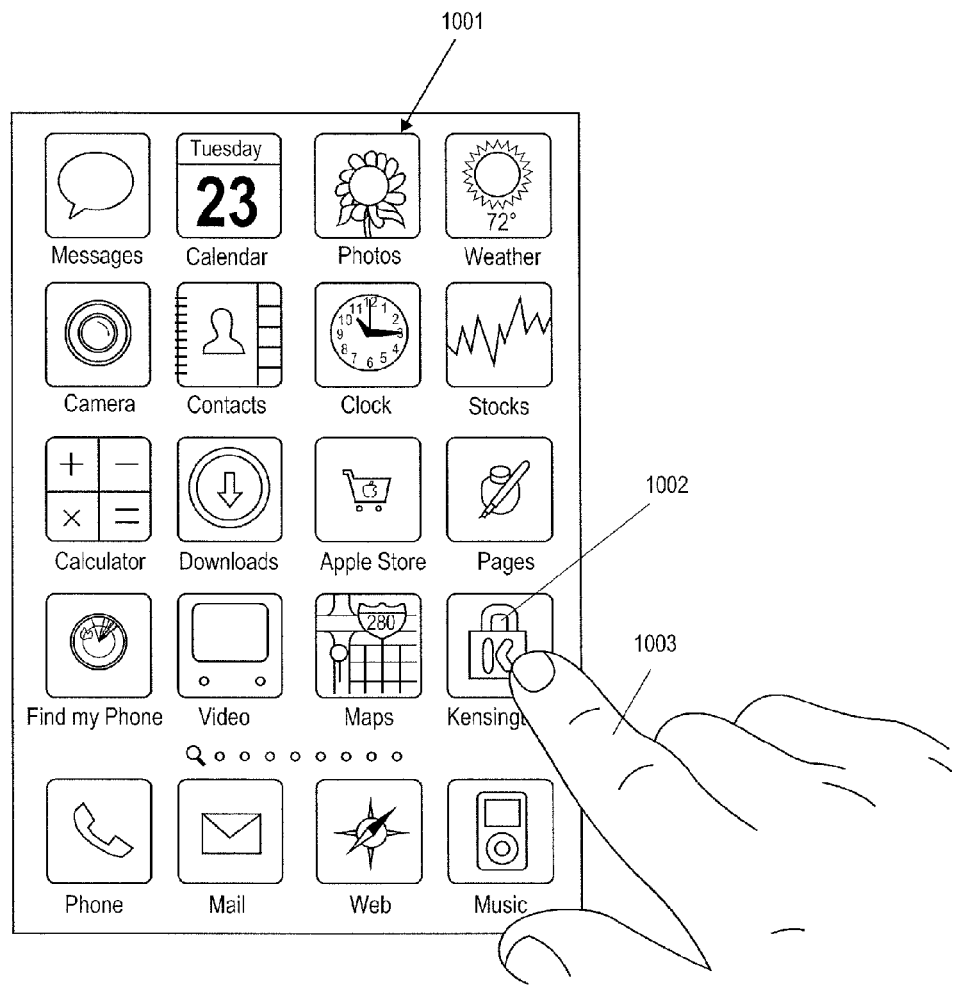
FIGS. 10-14 show exemplary screenshots of using an application to manage, configure, and interact with an object proximity and tracking system according to embodiments of the invention.

FIGS. 10-14 show exemplary screen shots of an exemplary application for the mobile communication device 110 shown in FIG. 3. FIG. 10 shows an exemplary screenshot of the display 1501 of the mobile communication device 110 after the application 1502 has been downloaded and shows a user 1503 launching the application by tapping on the application icon 1502. FIGS. 11A and 11B show exemplary home screenshots of the object proximity and tracking application showing the different tags 140 being tracked, their proximity to the user, a visual icon for easy identification, and their battery status. FIGS. 12A-12C show exemplary screenshots of the application when the system is registering a new tag. FIG. 13A shows an exemplary details screen for a selected, initialized, and authenticated tag. FIG. 13B shows a tag with the "find me" functionality activated. FIG. 14A shows a settings screen for the "notify on approach" proximity detection functionality of embodiments of the present invention. Finally, FIG. 14B shows an exemplary screenshot of the "last seen" functionality of embodiments of the present invention.

Figure 11B:
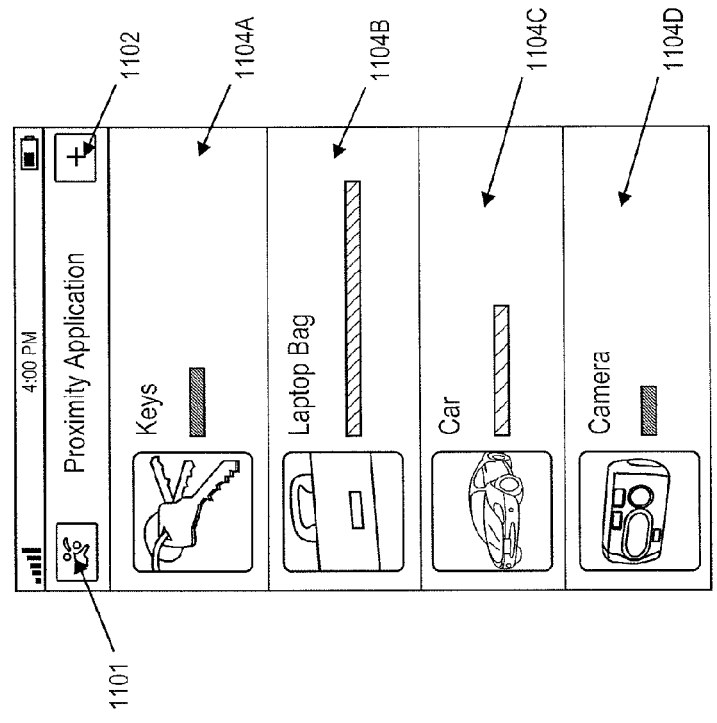
Figure 11A:
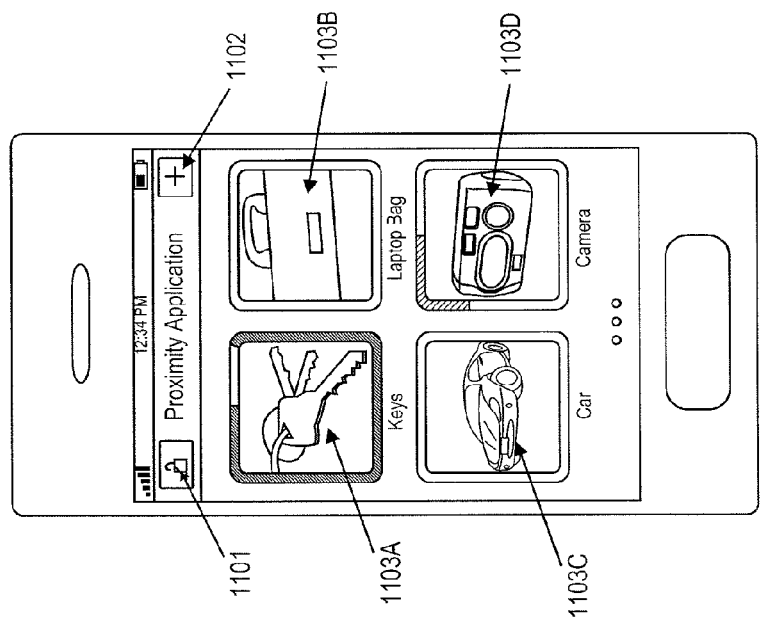

FIGS. 11A and 11B show exemplary home screenshots of the object proximity and tracking application showing the different tags 140 being tracked, their proximity to the user, a visual icon for easy identification, and their battery status. FIG. 11A shows an exemplary embodiment of the application where the main screen may be implemented as separate squares showing the previously registered tags 1103A-1103D. Each square includes a visual identifier, name, and proximity indication to quickly and easily inform the user of the power and proximity status of the registered tags. Additionally, the user can easily see that some tags are not activated (e.g. the laptop bag and the car are not current activated as they show no proximity indicator). Additionally, the proximity indicator may have different colors to indicate a power status for the tag. For example, if the power status is in a low state, the proximity indicator could be red while if the power status is full, the proximity indicator could be green, blue, or some other color. Additionally, other information could be provided through the color of the proximity indicator. For example, if the proximity indicator is growing (meaning the tag is moving further from the mobile communication device 110), the proximity indicator may be a red color to indicate that the danger level is increasing, while the color could change to blue if the tag is approaching the mobile communication device 110. Any other suitable information may be displayed through color as well. Additionally, the proximity indicator could be inverted such that the indicator displays the signal strength of the received wireless apparatuses, such that the larger the proximity indicator, the closer the tag may be to the mobile communication device 110.

The home screen allows the user to determine more information about each tag as well as configure each tag individually. From the home screen, the user may additionally be able to re-order and remove tags. Furthermore, if the user taps on a row, the application enters a details screen associated with the selected tag where configuration settings may be set and further details provided about the tag. Additionally, in some embodiments, the user may be able to select a "find me" button from the home screen that initiates the "find my tag" functionality.

FIG. 11B illustrates an exemplary embodiment of the application where the main screen may be implemented as a row-based table where each tag 1104A-1104D is represented by a single row. Each row may display a visual identifier and a name for the tag (e.g. the name of the tag is "camera" and the visual identifier is a picture of a person taking a picture with a camera). Additionally, both home screens allow the user to configure profile settings by touching the settings button 1101 for the application or may add a tag by hitting the add tag button 1102.

Figure 12C:
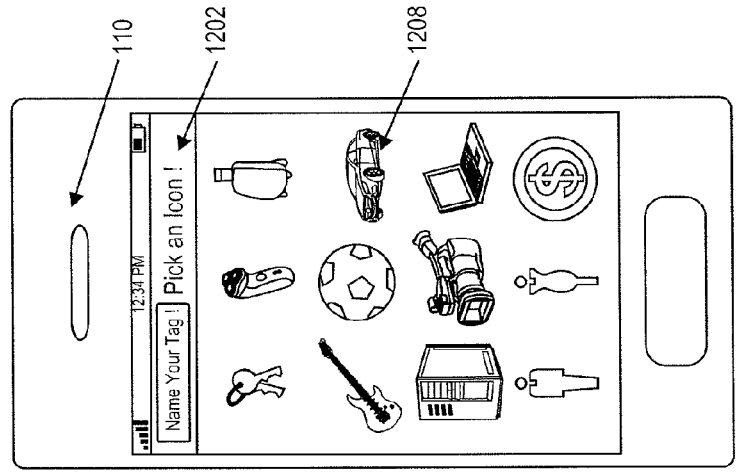
Figure 12B:
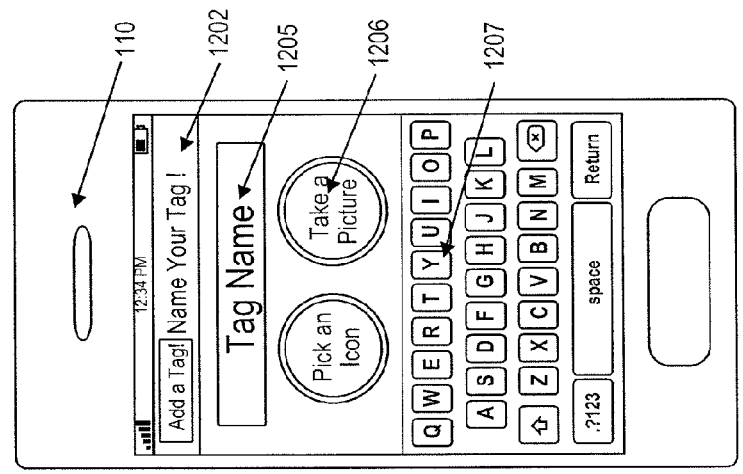
Figure 12A:
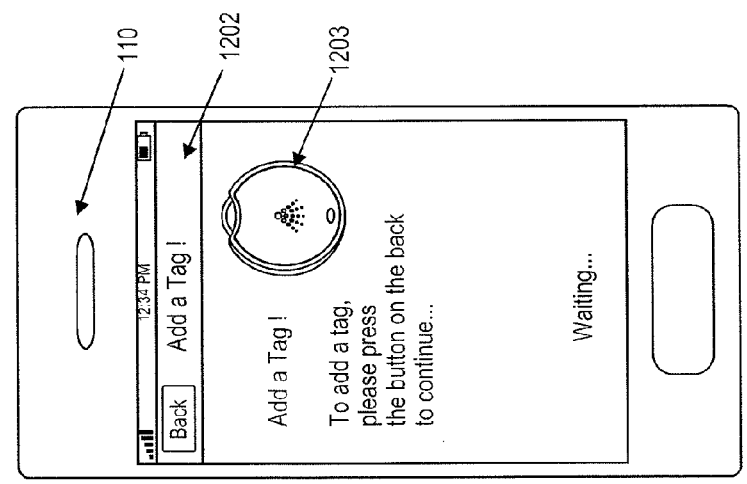

FIGS. 12A-12C show exemplary screenshots of the application when the system is registering a new tag. The user may be able to add tags to the application by tapping on a special add tag button 1102 in the top right portion of the home screen. FIG. 12A shows an exemplary screenshot of an "add a tag" pairing screen that is launched after the user presses the "add a tag" button. Pressing the "add a tag" button opens the "add a tag" pairing screen which informs the user to initiate the pairing button on a tag or fob within pairing range of the mobile communication device 110. The screen is labeled, "Add A Tag," 1102 and informs the user that in order for the user to register a tag with the application, the user should input the pairing button on the tag within pairing range. The mobile communication device 110 may listen for pairing advertisement messages from tags within pairing distance and may move to the tag registration screen once the mobile communication device 110 receives the pairing advertisement message. The first tag discovered that may be authenticated is selected to be the tag to add. Once the first tag is discovered, the discovery mode is stopped. Furthermore, the application registers the tag identification data, such that the application may now try to connect anytime the tag becomes disconnected.

FIG. 12B shows an exemplary screenshot of the tag naming screen for a tag that is discovered by the mobile communication device 110. This screen allows the user to name the tag and select a picture from their photo library, take a picture and crop, select from the album, or select an included icon. Additionally, the user may enter a tag name. If the user picks the "select an icon", a screen showing several icons may be presented (e.g. three to a row as shown in FIG. 12C). The user may be able to scroll up/down to see all the icons. Tapping on an icon selects that icon.

Figure 13B:
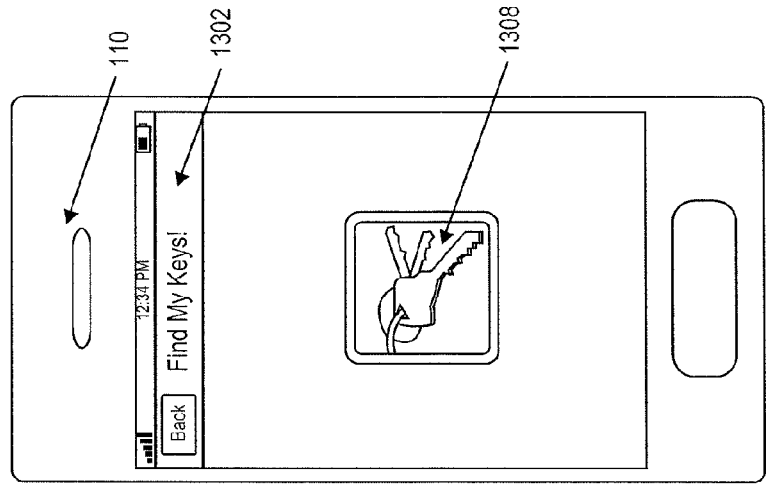
Figure 13A:
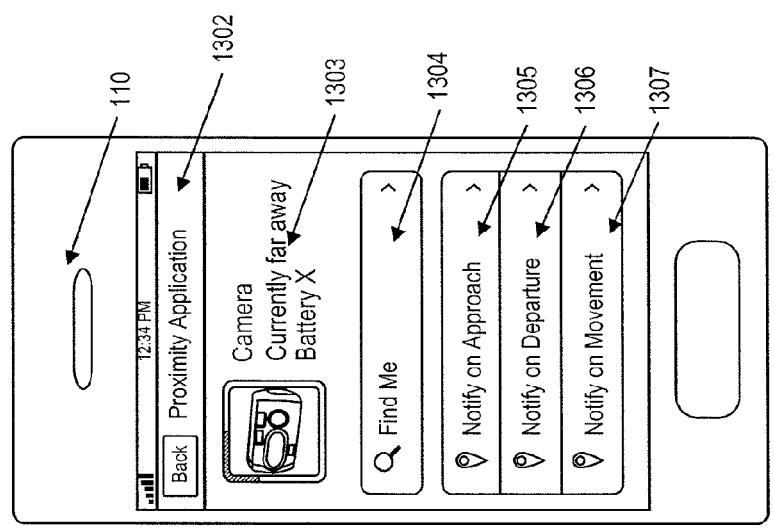

FIG. 13A shows an exemplary details screen for a selected, initialized, and authenticated tag. The user may tap on an icon in the main screen to view details about a registered tag. This screen has two main sections. The top section 1303 of the table displays an icon and name of the tag, the battery status, and the proximity to the mobile communication device 110 (e.g. "currently far away"). If the tag is in range, the screen may display a textual description of proximity (e.g. roughly how far the tag is away from the mobile communication device 110). However, if the tag is not in range, the screen may display the time since the tag was last seen. Additionally, if the tag is currently in the connecting/initialization state, the screen may display either "Connecting . . . " or "Initializing . . . " The status display in this section is live and is constantly updated. Furthermore, the user may be able to tap on the icon to rename the tag as well as change the visual identifier (e.g. icon/photo) for the tag.

The bottom section of the table displays entries which enable/disable/configure features for the tag. For example, in FIG. 13A, the "Find Me" functionality 1304, "Notify on Approach" functionality 1305, "Notify on Departure" functionality 1306, and "Notify on Movement" functionality 1307 are all highlighted and available to activate and further define the configuration settings for the functionality. Note that each tag has its own specific configuration separate and unrelated to the configuration of the other tags. Additionally, different tags may also have different capabilities and the rows of this section are displayed or not depending on whether a tag supports a particular feature.

FIG. 13B shows an exemplary screenshot of a tag that has the "find me" functionality activated. The tag may have entered this screen by the user pressing the "Find Me" button in FIG. 13A or through a direct "Find Me" button pressed in the earlier main screen.

The "Find Me" screen is used to aid the user in finding a tag. The user may invoke this screen when they wish to issue visual or audio alerts to the tag so that they may find it. The "Find Me" screen can be invoked from the main screen or from the "Tag Details" screen. In either case, the tag is determined to be in range and connected. When this screen is invoked, the application initiates a command to be sent to the tag that plays a sound on the tag. Additionally, the "Find Me" screen may display a simple animation or visual indicator on the screen which connotes whether the user is getting closer or farther away from the tag. For example, the "Find Me" screen may display the icon of the tag in the middle of the screen and a pulsating circle around the icon. As the tag becomes closer, the circle grows, the color saturation increases, and/or color changes to red. As the tag becomes farther away, the screen may shrink the circle, decrease the color saturation, and/or change the color to blue. Additionally, at the bottom of the screen, there may be text informing the user whether they are getting closer or further from the tag. Any suitable visual and/or auditory indicators may be implemented to indicate to a user whether they are approaching or moving away from the tag.

Additionally, if the tag becomes disconnected from the mobile communication device 110 during while the "find me" functionality is active, the application may display a dialog indicating that the tag has disconnected and present an option to take the user to the "Last Seen" screen to see where the tag was last seen.

FIG. 14A shows a settings screen for the "notify on approach" proximity detection functionality of embodiments of the present invention. The notify on approach functionality provides that if the tag comes into range and is connected with the mobile communication device 110 again, it may alert the user. Each type of notification (e.g. separation, approach, movement) may have a similar settings screen as shown here but may have different individual settings. For the notify on approach detection functionality, the configuration settings may include whether the type of notification is enabled or disabled 1403, the type of sound to make for the notification 1404, a selection of the sound clip to play 1405, and a sensitivity level (e.g. proximity setting) for the alert threshold 1406. In this example, the proximity setting 1406 may be set by moving a visual indicator on a display to the left or right to indicate the closest or furthest sensitivity setting (roughly corresponding to an alert proximity). Other embodiments may incorporate a digit value that may be input for average corresponding separation distance (e.g. 30 feet), a signal strength RSSI value (e.g. −60 dB), or any other suitable measurement of distance or signal strength. Accordingly, the user can update configuration settings for the application through the menu. Once the configuration settings are input through data inputs by the user, the application may update the configuration settings in the next wireless signal request and send the wireless signal request to the tag to update the tag's configuration settings.

FIG. 14B shows an exemplary screenshot of the application during the "Last Seen" functionality. "Last Seen" functionality may be used when the wireless apparatus is disconnected from the mobile communication device 110 due to traveling out of the transmission range of the mobile communication device 110. The "Last Seen" screen is used to aid the user in finding the tag when the tag is out of range. The In the exemplary screenshot of FIG. 14B, the application shows the user on a map where the tag was last seen. A map may be displayed and centered on the location where the tag is last seen (e.g. last stored location of the tag or last stored location of the mobile communication device when the mobile communication device lost communication with the tag). A visual indicator (e.g. a pin or other icon) may be displayed on the map, pin-pointing the captured coordinates and a transparent circle may be displayed around the pin to indicate the level of accuracy of the reading. A caption may be displayed above the pin. The main text may display a human readable name of the location of the tag. Alternatively or additionally, the latitude/longitude information may be shown. The subtitle may display the time that the tag was last seen and may provide some context since the tag was seen (e.g. if the tag was seen less than a minute ago, the display may say it was seen "Just now," or "1 minute ago." Furthermore, below the map is a caption indicating the distance from the current position to the last seen position. For example, the caption may read "10 miles away, 2 hours ago."

IV. OTHER EXEMPLARY EMBODIMENTS

User and System Profiles

Parameters such as starting RSSI threshold, hold-off time and transmit power affect the system's response to separation and approach events. These translate to different physical distances at which an alert would be generated. It is recognized that different locales and different situations may use different combinations of these parameters which may implement different profiles for different situations and locales for the user or multiple users. Accordingly, in some embodiments, the object proximity tracking application may offer quick selection among different profiles (safe, danger, airplane, etc.) either pre-installed or user generated.

Furthermore, as a user moves from locale to locale and as the surroundings and situations change, the user may find it beneficial to implement different profiles at different times. However, having to manually change profiles frequently is an inconvenience. Accordingly, the application may automatically change the active profile based on user determined rules. For example, these rules may include location of the mobile communication device 110 (GPS readings), time of day, and the presence of special tags called "zone tags." Any other suitable rules may be implemented in the system as well.

Zone Tags

A special class of tags may be used to mark a location or an area. When an associated mobile communication device 110 discovers such a tag, the application may change the mobile communication device 110 profile to match the configuration settings being provided by the zone tag. The application may then update the configuration settings for the connected wireless apparatus and send the updated configuration settings in the next wireless signal request. For example, a "safe zone" tag may be located in the user's home. When the mobile communication device 110 is in range of such a tag (hence in a 'safe zone') it relaxes the alert generation criteria to allow the user to leave his possessions further away from the mobile communication device 110. A zone tag and the mobile communication device 110 mutually authenticate through a mechanism that may allow the zone tag to simultaneously communicate with multiple tags. This mechanism may include the use of secret keys, synchronized clocks, cryptographic hashes and cryptographic message authentication codes.

In another embodiment of the invention may include pairing a tag with more than one mobile communication device 110. This may involve configuring a new mobile communication device 110 to sniff all transmissions in the vicinity to find the tag, putting the tag in a pairing mode, acknowledging the tags' transmissions with a command packet instructing it to add the pairing, then exiting pairing mode. Once paired with two mobile communication devices 110, a tag may transmit twice as often, making separate transmissions to each mobile communication device 110 in order that the acknowledgements from the mobile communication devices 110 do not collide.

In another embodiment of the present invention, the mobile communication device comprises a processor, an antenna, a transceiver device electrically coupled to the antenna and the processor, and a computer readable medium coupled to the processor and comprising code executable by the processor to implement a method. The method may include receiving a wireless communication from a wireless apparatus attached to an object, determining a signal strength reading from the communication, determining if the signal strength reading is below an alert threshold, wherein the alert threshold is adaptable, and if the signal strength reading is below the alert threshold, alerting a user, wherein the method further comprises receiving a data input from the user, updating configuration settings for the wireless apparatus, and sending a wireless communication to the wireless apparatus, wherein the wireless communication includes the configuration settings.

In another embodiment of the present invention, the mobile communication device comprises a processor, an antenna, a transceiver device electrically coupled to the antenna and the processor, and a computer readable medium coupled to the processor and comprising code executable by the processor to implement a method. The method may include receiving a wireless communication from a wireless apparatus attached to an object, determining a signal strength reading from the communication, determining if the signal strength reading is below an alert threshold, wherein the alert threshold is adaptable, and if the signal strength reading is below the alert threshold, entering a warning condition, wherein the warning condition initiates a first type of alert; if the signal strength reading is below the alert threshold, determining if the signal strength reading is below a buffer threshold, and wherein if the signal strength reading is below the buffer threshold, entering an alarm condition, wherein the alarm condition initiates a second type of alert.

Specific details regarding some of the above-described aspects are provided. The specific details of the specific aspects may be combined in any suitable manner without departing from the spirit and scope of embodiments of the disclosure.

V. TECHNICAL ADVANTAGES

Embodiments of the present invention provide a number of technical advantages. The security system provides a simple, efficient, interactive, customizable, and effective solution to monitoring, tracking, and receiving notifications regarding objects of interest. The system increases security for a consumer's personal objects leading to less identity theft and allows a consumer to rest assured that their monitored objects are within a safe distance of them at all times and that the user may be notified if their objects of interest move out of a predetermined distance.

Another advantage of the present invention is that some embodiments of the proximity application implement an adaptable alert threshold. The adaptable alert threshold may be implemented by determining an expected signal strength reading and calculating a difference between the expected signal strength reading and the received signal strength reading. If the difference is larger than an allowed change value, the application may calculate a threshold change value and change or update the alert threshold by the threshold change value. The updated alert threshold may then be used to determine whether the received signal strength reading is below the updated alert threshold. Accordingly, if an environmental change impacts a signal strength reading drastically, the application may adapt the behavior of the system. Therefore, an adaptable alert threshold allows the application to limit false alarms that are caused by environmental interference or disturbances which do not necessarily indicate an alarm or danger situation.

Another technical advantage of some embodiments of the present invention is provided by implementing a hold-off period and/or a buffer threshold to limit false alarms. A hold-off period may be implemented to delay the entering of an alarm condition until a predetermined number of signal strength readings from a wireless apparatus are below the alert threshold. Accordingly, if the received signal strength readings are below the alert threshold for a brief or momentary time period which is smaller than the predetermined hold-off period, the alarm condition may not be entered and the user may not be alerted. Furthermore, in some embodiments, a buffer threshold may be implemented such that if the filtered signal strength reading is below an alert threshold, an alarm condition may not be entered until the filtered signal strength reading is below an additional buffer threshold that may be a further predetermined signal strength value below the alert threshold. As such, if the wireless apparatus is close to the sensitivity limit corresponding to the alert threshold, the alarm condition is not entered repeatedly if the filtered signal strength readings are impacted by environmental disturbances. Accordingly, both of these features provide the technical advantages of reducing false alarms which lead to higher consumer satisfaction, increase security for the system as the user may not decrease the sensitivity setting just to limit false alarms, and overall better performance for the system.

Additionally, embodiments of the present invention provide the technical advantages of more efficient power usage through adaptable configuration settings. Embodiments of the present invention allow the application to determine a power reading of the wireless apparatus and depending on the power reading and the received signal strength reading, the system may update the configuration settings including transmission power, rate of transmission of wireless communications including signal strength readings, and notification settings for the wireless apparatus. Allowing the application to change the configuration settings of a wireless apparatus allows the system to implement adaptable transmission power based on the current filtered signal strength readings of the wireless apparatus, which saves power so that the wireless apparatus does not send a wireless communication with a transmission distance that is further than necessary, thus wasting power. Additionally, the adaptable transmission rate can save the power supply of the wireless apparatus when the wireless apparatus is not in a dangerous situation by slowing the rate of transmission of signal strength readings. Furthermore, increasing the adaptable transmission rate when the wireless apparatus is in a dangerous situation may lead to a more secure system as less time may lapse between received signal strength readings. Additionally, updating the configuration settings to change the notification settings allows the system to be easily customizable by a user and allows a variety of functionality to be implemented with the same wireless apparatus.

Finally, another advantage of embodiments of the invention is that while the fob and the mobile communication device are in range, they can be used to find each other in the case of accidental loss or misplacement of one apparatus or the other. One may issue the request to the other, via a button-press on the fob or via the application for the mobile communication device. Accordingly, embodiments of the present invention provide a number of technical advantages.

Figure 15:
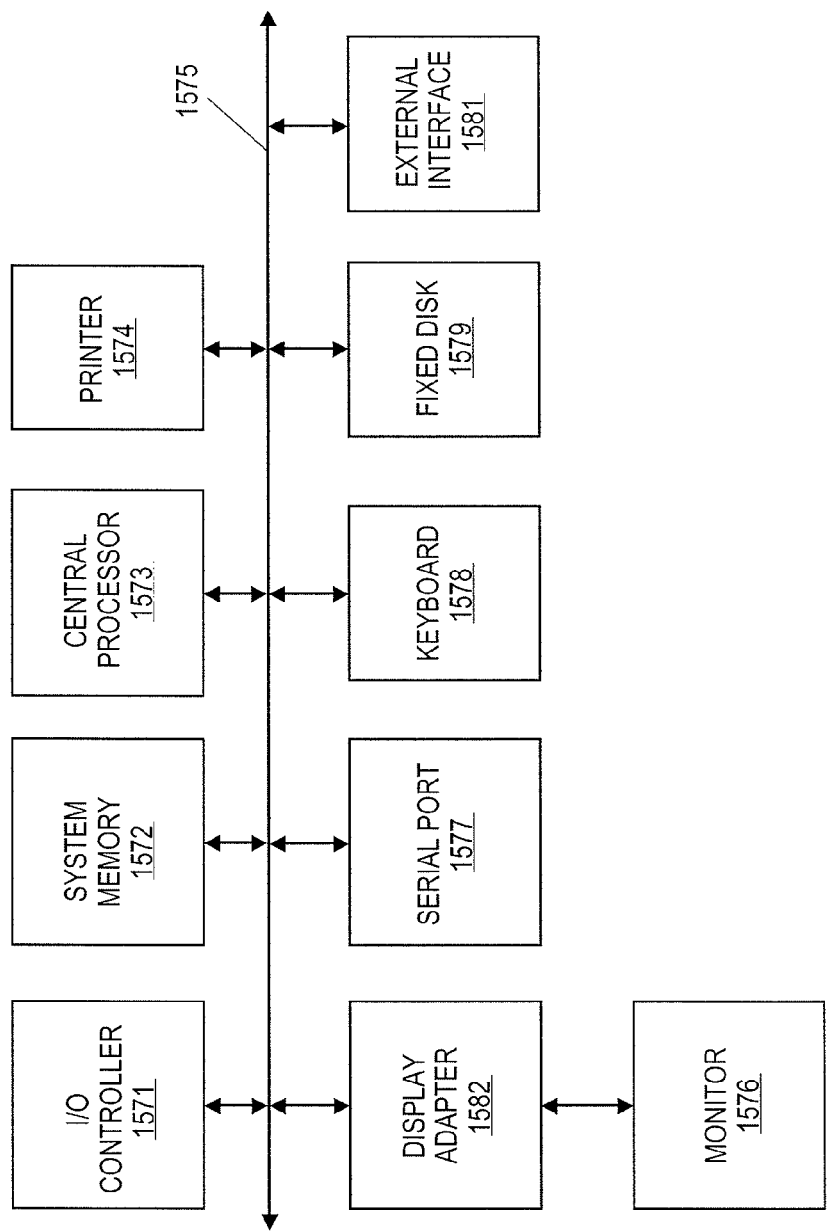
FIG. 15 shows a block diagram of an exemplary computer system.

FIG. 15 shows a block diagram of subsystems that may be present in computer apparatuses that are used in system shown in FIGS. 1 and 2. The various participants and elements in the previously described figures may operate using one or more computer apparatuses to facilitate the functions described herein. Any of the elements in the figures may use any suitable number of subsystems to facilitate the functions described herein. Examples of such subsystems or components are shown in FIG. 15. The subsystems shown in FIG. 15 are interconnected via a system bus 1575. Additional subsystems such as a printer 1574, keyboard 1578, fixed disk 1579 (or other memory comprising computer readable media), monitor 1576, which is coupled to display adapter 1582, and others are shown. Peripherals and input/output (I/O) devices, which couple to I/O controller 1571, can be connected to the computer system by any number of means known in the art, such as serial port 1577. For example, serial port 1577 or external interface 1581 can be used to connect the computer apparatus to a wide area network such as the Internet, a mouse input device, or a scanner. The interconnection via system bus allows the central processor 1573 to communicate with each subsystem and to control the execution of instructions from system memory 1582 or the fixed disk 1579, as well as the exchange of information between subsystems. The system memory 1582 and/or the fixed disk 1579 may embody a computer readable medium.

It should be understood that the present disclosure as described above can be implemented in the form of control logic using computer software in a modular or integrated manner. Based on the disclosure and teachings provided herein, a person of ordinary skill in the art will know and appreciate other ways and/or methods to implement the present disclosure using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A mobile communication device comprising:
a processor;
an antenna;
a transceiver device electrically coupled to the antenna and the processor; and
a non-transitory computer readable medium coupled to the processor and comprising code executable by the processor to implement a method, the method comprising:
receiving a wireless communication from a wireless apparatus attached to an object;
determining a signal strength reading from the wireless communication;
determining if the signal strength reading is below an alert threshold, wherein the alert threshold is adaptable;
determining an expected signal strength reading corresponding to the wireless communication;
calculating a difference between the signal strength reading and the expected signal strength reading;
determining if the difference is larger than an allowed change value;
if the difference is larger than the allowed change value, calculating a threshold change value and modifying the alert threshold by the threshold change value; and
if the signal strength reading is below the alert threshold, alerting a user.

2. The mobile communication device of claim 1, wherein the method further comprises:
before alerting a user, determining if a predetermined number of previous signal strength readings for the wireless apparatus are below the alert threshold; and
if the predetermined number of previous signal strength readings are not below the alert threshold, storing the signal strength reading.

3. The mobile communication device of claim 1, wherein the method further comprises:
before receiving a communication from a wireless apparatus, waiting a predetermined period of time for a wireless communication from a wireless apparatus; and
if no wireless communication is received, alerting the user.

4. The mobile communication device of claim 3, wherein the method further comprises:
determining a last location of the wireless apparatus; and
displaying the last location of the wireless apparatus on a display of the mobile communication device.

5. The mobile communication device of claim 1, wherein the method further comprises:
determining a power status for the wireless apparatus;
updating configuration settings for the wireless apparatus; and
sending a wireless communication to the wireless apparatus, wherein the wireless communication includes the configuration settings.

6. The mobile communication device of claim 5, wherein configuration settings include one or more of a rate of transmission of wireless communications, a transmission power, and a movement notification setting for the wireless apparatus.

7. The mobile communication device of claim 1, wherein the method further comprises:
determining a movement indicator from the wireless communication; and
alerting the user if the movement indicator indicates the wireless apparatus is moving.

8. The mobile communication device of claim 1, wherein the alert threshold corresponds to a predetermined sensitivity setting.

9. The mobile communication device of claim 1, wherein the wireless apparatus is a first wireless apparatus and the wireless communication is a first wireless communication, and wherein the method further comprises:
receiving a second wireless communication from a second wireless apparatus;
determining zone settings from the second wireless communication;
updating profile settings for the mobile communication device with the zone settings;
updating configuration settings for the first wireless apparatus with the zone settings; and
sending a third wireless communication to the first wireless apparatus, wherein the third wireless communication includes the configuration settings.

10. A method comprising:
receiving a wireless communication from a wireless apparatus attached to an object;
determining a signal strength reading from the communication;
determining an expected signal strength reading corresponding to the wireless communication;
calculating a difference between the signal strength reading and the expected signal strength reading;
determining if the difference is larger than an allowed change value;
determining if the signal strength reading is below an alert threshold, wherein the alert threshold is adaptable based on an expected signal strength corresponding to the wireless communication, wherein the expected signal strength is predicted based on a previously received signal strength reading;
if the difference is larger than the allowed change value, calculating a threshold change value and modifying the alert threshold by the threshold change value; and
if the signal strength reading is below the alert threshold, alerting a user.

11. The method of claim 10 further comprising:
before alerting a user, determining if a predetermined number of previous signal strength readings for the wireless apparatus are below the alert threshold; and
if the predetermined number of previous signal strength readings are not below the alert threshold, storing the signal strength reading.

12. The method of claim 10 further comprising:
before receiving a communication from a wireless apparatus, waiting a predetermined period of time for a wireless communication from a wireless apparatus; and
if no wireless communication is received, alerting the user.

13. The method of claim 12 further comprising:
determining a last location of the wireless apparatus; and
displaying the last location of the wireless apparatus on a display of the mobile communication device.

14. The method of claim 10 further comprising:
determining a power status for the wireless apparatus;
updating configuration settings for the wireless apparatus; and
sending a wireless communication to the wireless apparatus, wherein the wireless communication includes the configuration settings.

15. The method of claim 14, wherein configuration settings include one or more of a rate of transmission of wireless communications, a transmission power, and a movement notification setting for the wireless apparatus.

16. The method of claim 10 further comprising:
determining a movement indicator from the wireless communication; and
alerting the user if the movement indicator indicates the wireless apparatus is moving.

17. The method of claim 10, wherein the alert threshold corresponds to a predetermined sensitivity setting.

18. The method of claim 10, wherein the wireless apparatus is a first wireless apparatus and the wireless communication is a first wireless communication, and wherein the method further comprises:
receiving a second wireless communication from a second wireless apparatus;
determining zone settings from the second wireless communication;
updating profile settings for the mobile communication device with the zone settings;
updating configuration settings for the first wireless apparatus with the zone settings; and
sending a third wireless communication to the first wireless apparatus, wherein the third wireless communication includes the configuration settings.

* * * * *